US011823507B2

(12) United States Patent
Arashima et al.

(10) Patent No.: US 11,823,507 B2
(45) Date of Patent: Nov. 21, 2023

(54) RECORDING DEVICE, RECORDING METHOD, AND COMPUTER PROGRAM

(71) Applicant: SONY CORPORATION, Tokyo (JP)

(72) Inventors: Kenji Arashima, Kanagawa (JP); Hiroshi Okada, Kanagawa (JP); Yukihiro Kobayashi, Chiba (JP)

(73) Assignee: SONY CORPORATION, Tokyo (JP)

( * ) Notice: Subject to any disclaimer, the term of this patent is extended or adjusted under 35 U.S.C. 154(b) by 64 days.

(21) Appl. No.: 17/022,454

(22) Filed: Sep. 16, 2020

(65) Prior Publication Data

US 2020/0410789 A1   Dec. 31, 2020

Related U.S. Application Data

(63) Continuation of application No. 15/554,131, filed as application No. PCT/JP2016/055786 on Feb. 26, 2016, now Pat. No. 10,825,271.

(Continued)

(51) Int. Cl.
*G07C 5/08* (2006.01)
*G08G 1/00* (2006.01)
(Continued)

(52) U.S. Cl.
CPC .......... *G07C 5/0858* (2013.01); *G06Q 40/08* (2013.01); *G07C 5/008* (2013.01); *G08G 1/0112* (2013.01); *G08G 1/0129* (2013.01); *G08G 1/205* (2013.01)

(58) Field of Classification Search
CPC ...... G07C 5/0858; G07C 5/008; G06Q 40/08; G08G 1/0112; G08G 1/0129; G08G 1/205
See application file for complete search history.

(56) References Cited

U.S. PATENT DOCUMENTS 5,497,419 A * 3/1996 Hill .................. H04N 19/00
386/E9.036
5,524,489 A * 6/1996 Twigg .................. G01P 15/093
73/514.26
(Continued)

FOREIGN PATENT DOCUMENTS

JP   2002-259708 A   9/2002
JP   2011-097169 A   5/2011
(Continued)

OTHER PUBLICATIONS

Non-Final Office Action for U.S. Appl. No. 15/554,131, dated Aug. 6, 2018, 17 pages.

(Continued)

*Primary Examiner* — Curtis J King
(74) *Attorney, Agent, or Firm* — CHIP LAW GROUP

(57) ABSTRACT

[Object] To provide a recording device capable of acquiring information on behavior of a moving body with high accuracy by using a simple configuration.
[Solution] Provided is the recording device including: a sensing unit configured to output data obtained through sensing; a reception unit configured to receive a wireless signal from a signal transmission device provided in a moving body; a recording control unit configured to control start and stop of recording of the data output from the sensing unit, in response to the wireless signal received by the reception unit from the signal transmission device; and a transmission unit configured to transmit the data recorded under the control of the recoding control unit, to an external device.

21 Claims, 21 Drawing Sheets

Related U.S. Application Data

(60) Provisional application No. 62/129,688, filed on Mar. 6, 2015.

(51) Int. Cl.
  *G08G 1/01* (2006.01)
  *G06Q 40/08* (2012.01)
  *G07C 5/00* (2006.01)

(56) References Cited

U.S. PATENT DOCUMENTS

| | | | |
|---|---|---|---|
| 5,646,349 A * | 7/1997 | Twigg | G01V 1/184 |
| | | | 73/514.38 |
| 5,973,867 A * | 10/1999 | Yamamoto | G08B 13/19669 |
| | | | 386/296 |
| 6,073,062 A | 6/2000 | Hoshino et al. | |
| 6,526,341 B1 | 2/2003 | Bird et al. | |
| 7,254,223 B1 | 8/2007 | Henderson | |
| 7,286,658 B1 | 10/2007 | Henderson | |
| 8,244,309 B2 | 8/2012 | Marumoto | |
| 8,350,907 B1 * | 1/2013 | Blanco | H04N 21/4335 |
| | | | 348/143 |
| 8,363,102 B1 * | 1/2013 | Kadoch | H04W 4/90 |
| | | | 348/148 |
| 9,086,948 B1 * | 7/2015 | Slusar | G01S 5/0284 |
| 9,280,252 B1 * | 3/2016 | Brandmaier | G06F 3/0482 |
| 9,367,968 B2 | 6/2016 | Giraud et al. | |
| 9,563,987 B2 | 2/2017 | Frashure et al. | |
| 9,633,488 B2 | 4/2017 | Carnell et al. | |
| 9,646,428 B1 | 5/2017 | Konrardy et al. | |
| 9,672,570 B1 * | 6/2017 | Slusar | G06Q 40/08 |
| 9,846,912 B1 * | 12/2017 | Slusar | G01S 19/13 |
| 9,863,928 B1 * | 1/2018 | Peterson | G01N 33/42 |
| 9,940,834 B1 | 4/2018 | Konrardy et al. | |
| 9,972,054 B1 | 5/2018 | Konrardy et al. | |
| 10,029,696 B1 | 7/2018 | Ferguson | |
| 10,032,216 B2 | 7/2018 | Binion et al. | |
| 10,035,514 B1 | 7/2018 | Lambert | |
| 10,096,070 B1 * | 10/2018 | Slusar | H04W 4/029 |
| 10,140,863 B2 | 11/2018 | Tucker et al. | |
| 10,145,684 B1 * | 12/2018 | Tofte | G01C 11/02 |
| 10,157,384 B2 * | 12/2018 | Lesesky | G07C 5/085 |
| 10,572,943 B1 * | 2/2020 | Tye | G06Q 40/08 |
| 10,720,080 B1 * | 7/2020 | Fields | G09B 19/14 |
| 10,937,105 B1 * | 3/2021 | Slusar | G01S 13/00 |
| 11,105,640 B1 * | 8/2021 | Hayward | G08G 1/096725 |
| 2002/0190118 A1 * | 12/2002 | Davenport | G07F 7/025 |
| | | | 235/375 |
| 2004/0198461 A1 | 10/2004 | Coombes | |
| 2005/0096809 A1 | 5/2005 | Skeen et al. | |
| 2005/0119009 A1 * | 6/2005 | Bauchot | G07C 5/008 |
| | | | 455/456.1 |
| 2006/0092043 A1 * | 5/2006 | Lagassey | G07C 5/0891 |
| | | | 340/907 |
| 2006/0095199 A1 * | 5/2006 | Lagassey | G07C 5/0891 |
| | | | 340/933 |
| 2006/0215030 A1 * | 9/2006 | Shih | G08B 13/19652 |
| | | | 348/143 |
| 2007/0216520 A1 * | 9/2007 | Ho | B60Q 1/525 |
| | | | 348/148 |
| 2008/0252487 A1 | 10/2008 | McClellan et al. | |
| 2008/0258890 A1 | 10/2008 | Follmer et al. | |
| 2009/0051510 A1 | 2/2009 | Follmer et al. | |
| 2009/0177354 A1 * | 7/2009 | Agrawal | G01M 17/007 |
| | | | 701/33.4 |
| 2009/0266886 A1 | 10/2009 | Anzai et al. | |
| 2009/0318121 A1 * | 12/2009 | Marumoto | G07C 5/085 |
| | | | 455/414.1 |
| 2010/0024021 A1 | 1/2010 | Heath et al. | |
| 2010/0063850 A1 * | 3/2010 | Daniel | G06Q 40/08 |
| | | | 705/4 |
| 2010/0088199 A1 | 4/2010 | McKethan | |
| 2010/0131304 A1 * | 5/2010 | Collopy | G06Q 30/0224 |
| | | | 705/4 |
| 2010/0131305 A1 * | 5/2010 | Collopy | G06Q 30/0224 |
| | | | 705/4 |
| 2011/0167357 A1 | 7/2011 | Benjamin et al. | |
| 2011/0238300 A1 | 9/2011 | Schenken | |
| 2011/0267468 A1 | 11/2011 | Lin | |
| 2012/0088462 A1 | 4/2012 | Mader et al. | |
| 2012/0232747 A1 | 9/2012 | Miners et al. | |
| 2012/0252420 A1 | 10/2012 | Czaja et al. | |
| 2013/0006674 A1 | 1/2013 | Bowne et al. | |
| 2013/0041521 A1 | 2/2013 | Basir et al. | |
| 2013/0046510 A1 | 2/2013 | Bowne et al. | |
| 2013/0151588 A1 | 6/2013 | Basir | |
| 2013/0253760 A1 | 9/2013 | Berman et al. | |
| 2013/0261880 A1 | 10/2013 | Cho et al. | |
| 2013/0304349 A1 * | 11/2013 | Davidson | G08G 1/202 |
| | | | 701/99 |
| 2013/0317694 A1 | 11/2013 | Merg et al. | |
| 2013/0339019 A1 | 12/2013 | Giancarlo et al. | |
| 2014/0006160 A1 | 1/2014 | McDevitt et al. | |
| 2014/0067434 A1 | 3/2014 | Bourne et al. | |
| 2014/0129336 A1 | 5/2014 | Bailey | |
| 2014/0148972 A1 | 5/2014 | Basir et al. | |
| 2014/0195100 A1 * | 7/2014 | Lundsgaard | G07C 5/0841 |
| | | | 701/29.6 |
| 2014/0213238 A1 | 7/2014 | Giraud et al. | |
| 2014/0214499 A1 * | 7/2014 | Hudson | G07B 15/02 |
| | | | 705/13 |
| 2014/0337319 A1 | 11/2014 | Chen | |
| 2015/0025917 A1 | 1/2015 | Stempora | |
| 2015/0057956 A1 | 2/2015 | Ooe et al. | |
| 2015/0081404 A1 | 3/2015 | Basir | |
| 2015/0088618 A1 | 3/2015 | Basir et al. | |
| 2015/0106289 A1 | 4/2015 | Basir et al. | |
| 2015/0161824 A1 | 6/2015 | Miners et al. | |
| 2015/0170428 A1 | 6/2015 | Harter et al. | |
| 2015/0175168 A1 | 6/2015 | Hoye et al. | |
| 2015/0191178 A1 | 7/2015 | Roy et al. | |
| 2015/0213656 A1 | 7/2015 | Stacy | |
| 2015/0310356 A1 | 10/2015 | Basir et al. | |
| 2016/0050203 A1 | 2/2016 | Hefetz | |
| 2016/0086394 A1 | 3/2016 | Yang et al. | |
| 2016/0110650 A1 | 4/2016 | Basir et al. | |
| 2016/0283963 A1 | 9/2016 | Zafiroglu et al. | |
| 2016/0371894 A1 * | 12/2016 | Rai | G01C 21/3697 |
| 2016/0378961 A1 * | 12/2016 | Park | G06F 21/36 |
| | | | 726/19 |
| 2017/0019481 A1 * | 1/2017 | Takeda | H04L 41/0873 |
| 2017/0026196 A1 | 1/2017 | Miners et al. | |
| 2017/0032402 A1 * | 2/2017 | Patsiokas | G06Q 30/0207 |
| 2017/0178511 A1 | 6/2017 | Berns et al. | |
| 2017/0212767 A1 | 7/2017 | Basargin | |
| 2017/0212768 A1 | 7/2017 | Basargin | |
| 2017/0247037 A1 | 8/2017 | Basir et al. | |
| 2017/0292848 A1 | 10/2017 | Nepomuceno et al. | |
| 2017/0294054 A1 | 10/2017 | Rosenbaum | |
| 2018/0068392 A1 | 3/2018 | Bowes et al. | |
| 2018/0154908 A1 | 6/2018 | Chen | |
| 2018/0176457 A1 * | 6/2018 | Koskan | H04N 7/188 |
| 2018/0204396 A1 | 7/2018 | Cox et al. | |
| 2018/0276903 A1 * | 9/2018 | Rai | H04W 4/40 |
| 2020/0005399 A1 * | 1/2020 | Takamatsu | G06N 5/04 |
| 2021/0142419 A1 * | 5/2021 | Davis | G06Q 30/0207 |
| 2021/0190812 A1 * | 6/2021 | Bretzigheimer | G01P 21/00 |

FOREIGN PATENT DOCUMENTS

| | | |
|---|---|---|
| JP | 2013-008347 A | 1/2013 |
| JP | 2013-167540 A | 8/2013 |
| JP | 2014-044692 A | 3/2014 |

OTHER PUBLICATIONS

Non-Final Office Action for U.S. Appl. No. 15/554,131, dated Jun. 13, 2019, 15 pages.
Non-Final Office Action for U.S. Appl. No. 15/554,131, dated Feb. 28, 2020, 09 pages.

(56) References Cited

OTHER PUBLICATIONS

Final Office Action for U.S. Appl. No. 15/554,131, dated Feb. 19, 2019, 18 pages.
Final Office Action for U.S. Appl. No. 15/554,131, dated Nov. 21, 2019, 15 pages.
Advisory Action for U.S. Appl. No. 15/554,131, dated Feb. 3, 2020, 03 pages.
Notice of Allowance for U.S. Appl. No. 15/554,131, dated Jun. 30, 2020, 08 pages.
International Search Report and Written Opinion of PCT Application No. PCT/JP2016/055786, dated Apr. 26, 2016, 08 pages of English Translation and 07 pages of ISRWO.
International Preliminary Report on Patentability of PCT Application No. PCT/JP2016/055786, dated Sep. 21, 2017, 08 pages of English Translation and 04 pages of IPRP.

\* cited by examiner

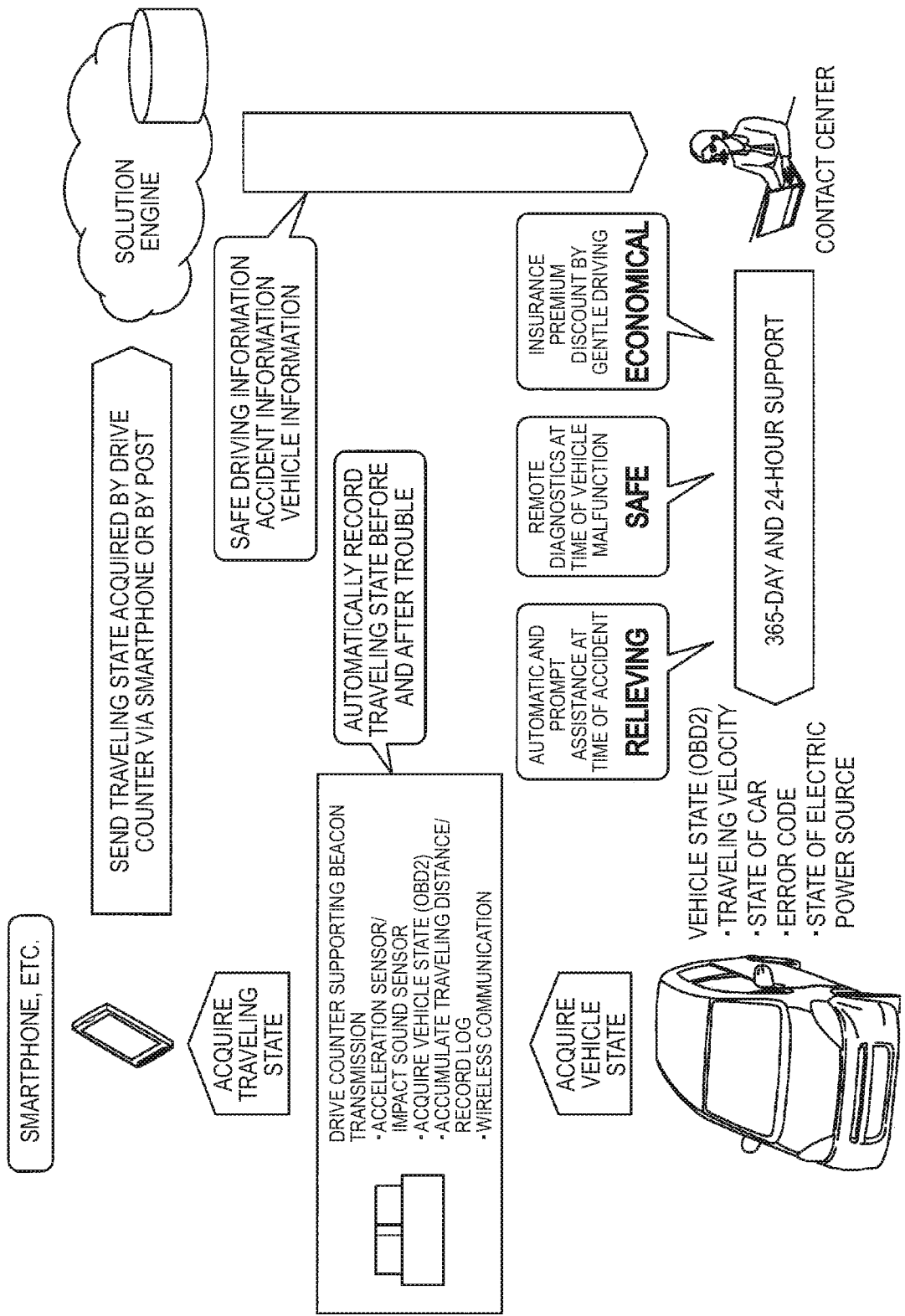

RECORDING DEVICE, RECORDING METHOD, AND COMPUTER PROGRAM

This application is a continuation application of U.S. patent application Ser. No. 15/554,131 filed on Aug. 28, 2017, which is a U.S. National Phase of International Patent Application No. PCT/JP2016/055786 filed on Feb. 26, 2016, which claims priority benefit of U.S. Provisional Application No. 62/129,688 filed in the USPTO on Mar. 6, 2015. Each of the above-referenced applications is hereby incorporated herein by reference in its entirety.

TECHNICAL FIELD

The present disclosure relates to recording devices, recording methods, and computer programs.

BACKGROUND ART

There are services which discount an insurance premium of automobile insurance or return a part of the insurance premium to a driver in accordance with details of driving of the driver who drives a moving body such as an automobile. An insurance company that provide such services sends a device for acquiring behavior of the automobile to the driver and asks the driver to place the device in the automobile. Accordingly, the insurance company can check the details of driving of the driver when the device is returned from the driver at a predetermined timing such as renewal of the insurance.

CITATION LIST

Patent Literature

Patent Literature 1

JP 2002-259708A

DISCLOSURE OF INVENTION

Technical Problem

However, manufacturing and sending of the device for acquiring behavior of the automobile cost time and money for the insurance company. In addition, for some drivers, it is burdensome to return the device to the insurance company.

Accordingly, the present disclosure proposes a novel and improved recording device, recording method, and computer program that are capable of acquiring information on behavior of a moving body with high accuracy by using a simple configuration.

Solution to Problem

According to the present disclosure, there is provided a recording device including: a sensing unit configured to output data obtained through sensing; a recording unit configured to start recording of the data that is output from the sensing unit and that relates to behavior of the moving body in accordance with a recording instruction from the moving body, and configured to ends recording of the data that is output from the sensing unit and that relates to behavior of the moving body in accordance with disruption of the recording instruction from the moving body; and a transmission unit configured to transmit the data recorded by the recoding unit to an external device.

In addition, according to the present disclosure, there is provided a recording method including: performing sensing; recording data on behavior of a moving body obtained through the sensing; transmitting the recorded data to an external device; and controlling start and stop of recording of the data obtained through the sensing, in response to a wireless signal from a signal transmission device provided in the moving body.

In addition, according to the present disclosure, there is provided a computer program causing a computer to execute: performing sensing; recording data on behavior of a moving body obtained through the sensing; transmitting the recorded data to an external device; and controlling start and stop of recording of the data obtained through the sensing, in response to a wireless signal from a signal transmission device provided in the moving body.

Advantageous Effects of Invention

As described above, according to the present disclosure, it is possible to provide the novel and improved recording device, recording method, and computer program that are capable of acquiring information on behavior of a moving body with high accuracy by using a simple configuration.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 21 is an explanatory diagram illustrating an effect of the drive counter 400 connected with a vehicle.

MODE(S) FOR CARRYING OUT THE INVENTION

Figure 1:
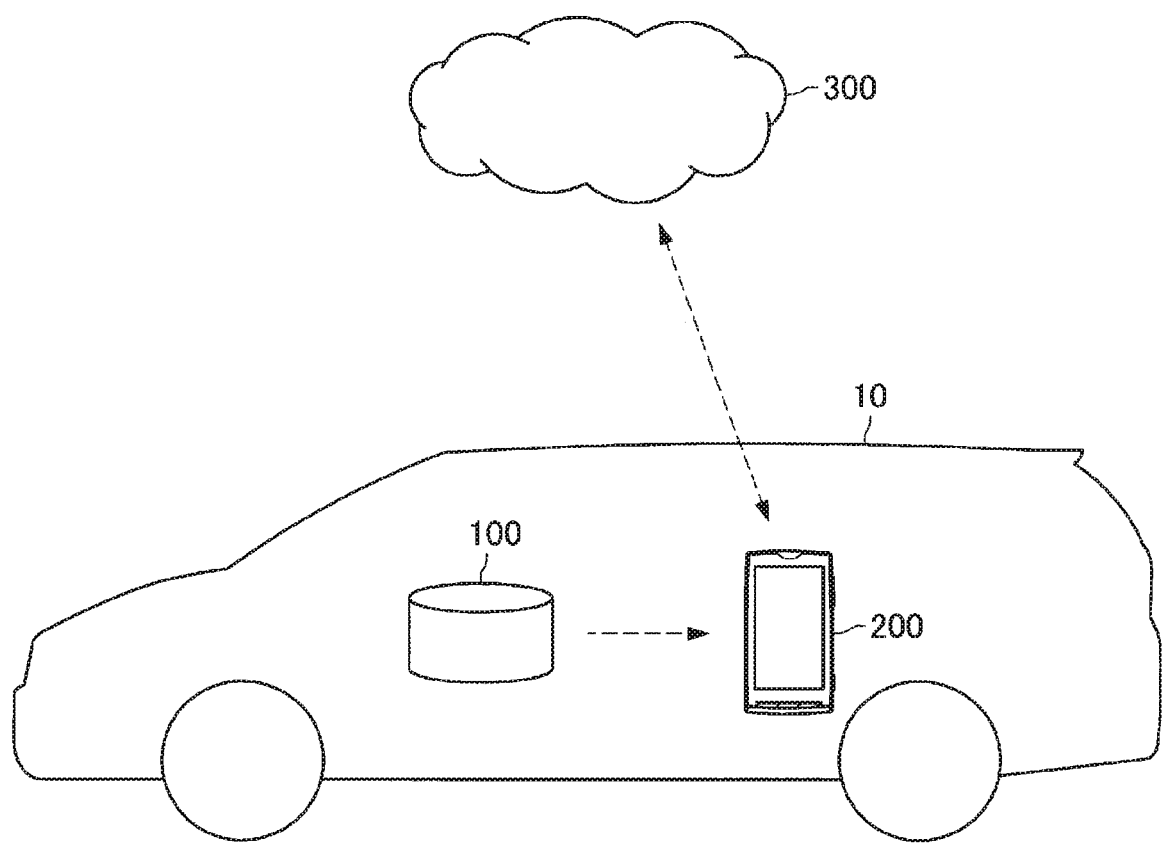
FIG. 1 is an explanatory diagram illustrating a configuration example of a system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, the description is given in the following order.
1. First Embodiment
1.1. System configuration example
1.2. Functional configuration example
1.3. Operation example
1.4. Modification
2. Second Embodiment
3. Conclusion

1. FIRST EMBODIMENT

1.1. System Configuration Example

First, a configuration example of a system according to a first embodiment of the present disclosure will be described.

FIG. 1 is an explanatory diagram illustrating the configuration example of the system according to the first embodiment of the present disclosure. FIG. 1 illustrates a schematic configuration of the system in which behavior of an automobile is sensed by a mobile terminal such as a smartphone provided with a sensor, and a result of the sensing is transmitted to a server. Next, a configuration example of the system according to the first embodiment of the present disclosure will be described with reference to FIG. 1.

As illustrated in FIG. 1, the signal output device 100 configured to output a beacon signal is placed in a vehicle 10, and the beacon signal output from the signal output device 100 is received by the mobile terminal 200 that is also placed in the vehicle 10 and includes a sensor. As the sensor, the mobile terminal 200 may include an acceleration sensor, an angular velocity sensor, a geomagnetic sensor, a barometric sensor, a camera, a microphone, a position sensor, and the like, for example. When receiving the beacon signal and determining that the vehicle 10 has started traveling, the mobile terminal 200 starts sensing using the sensor and transmits data obtained through the sensing to a server 300. The server 300 is a server managed by an insurance company that provides vehicle insurance.

In other words, the mobile terminal 200 placed in the vehicle 10 senses behavior of the vehicle 10 such as acceleration, deceleration, or stop by staring the sensing.

Subsequently, the server 300 managed by the insurance company that provides vehicle insurance can receive data obtained through the sensing performed by the mobile terminal 200, and recognize the behavior of the vehicle 10. Subsequently, it is possible for the insurance company that provides vehicle insurance to feed details of driving back to a driver who owns the vehicle 10 from the server 300 and discount a vehicle insurance premium or give cashback to the driver by acquiring the behavior of the vehicle 10 from the server 300.

The configuration example of the system according to the first embodiment of the present disclosure has been described above with reference to FIG. 1. Next, a functional configuration example of the signal output device 100 and the mobile terminal 200 according to the first embodiment of the present disclosure will be described.

1.2. Functional Configuration Example

Figure 2:
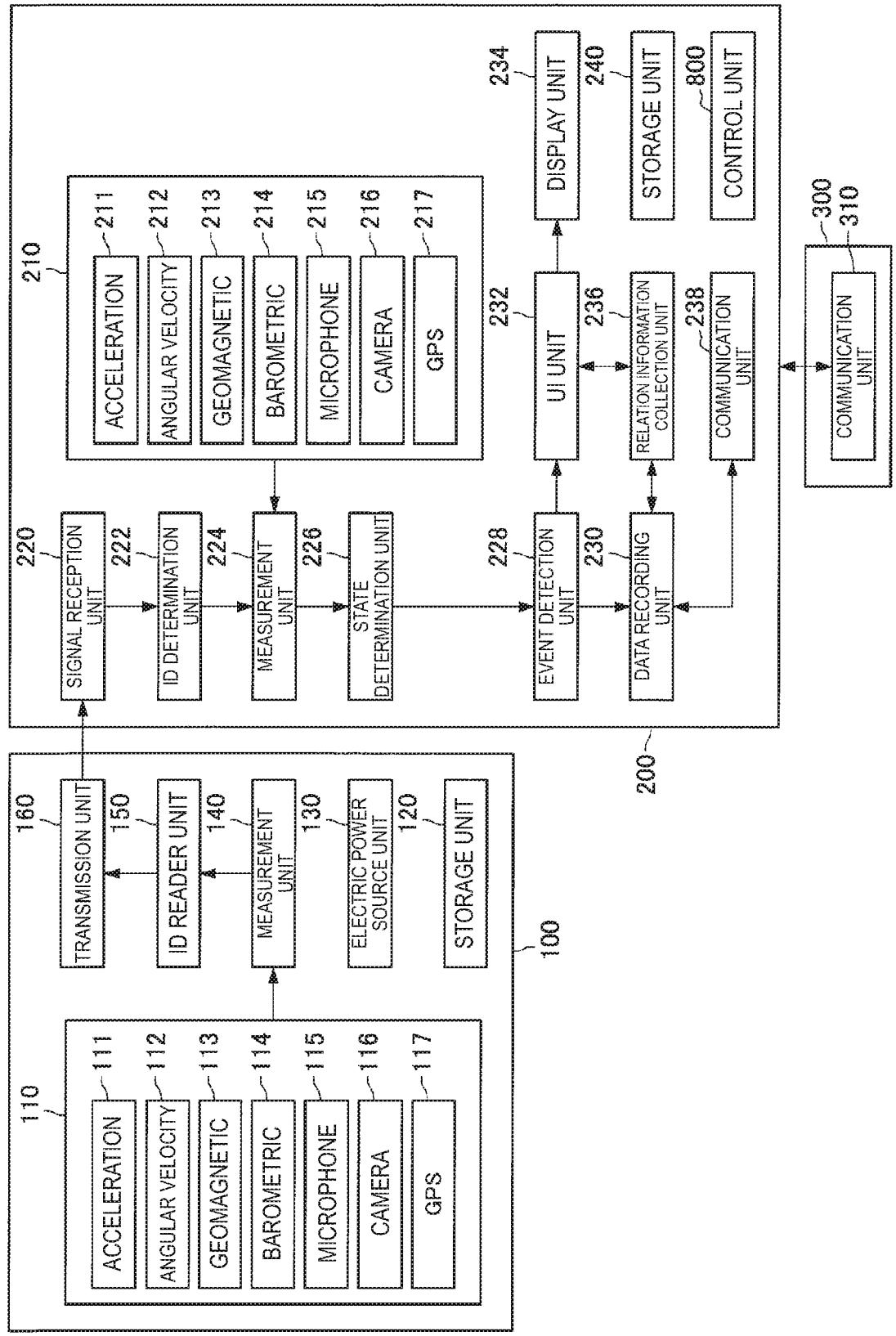
FIG. 2 is an explanatory diagram illustrating a functional configuration example of a signal output device 100 and a mobile terminal 200 according to the embodiment.

FIG. 2 is an explanatory diagram illustrating the functional configuration example of the signal output device 100 and the mobile terminal 200 according to the first embodiment of the present disclosure. Hereinafter, the functional configuration example of the signal output device 100 and the mobile terminal 200 according to the first embodiment of the present disclosure will be described with reference to FIG. 2.

As illustrated in FIG. 2, the signal output device 100 according to the first embodiment of the present disclosure includes a sensor unit 110, a storage unit 120, an electric power source unit 130, a measurement unit 140, an ID reader unit 150, and a transmission unit 160.

In addition, as illustrated in FIG. 2, the mobile terminal 200 according to the first embodiment of the present disclosure includes a sensor unit 210, a signal reception unit 220, an ID determination unit 222, a measurement unit 224, a state determination unit 226, an event detection unit 228, a data recording unit 230, a UI unit 232, a display unit 234, a relation information collection unit 236, a communication unit 238, a storage unit 240, and a control unit 800.

Note that, FIG. 2 illustrates the configuration in which the signal output device 100 and the mobile terminal 200 each include the sensor unit. However, the present disclosure is not limited thereto. For example, the signal output device 100 does not have to include the sensor unit 110.

First, details of a functional configuration of the signal output device 100 will be described. The sensor unit 110 is a set of sensors that sense behavior of the signal output device 100, a surrounding environment of the signal output device 100, and the like. According to the embodiment, the sensor unit 110 includes an acceleration sensor 111, an angular velocity sensor 112, a geomagnetic sensor 113, a barometric sensor 114, a microphone 115, a camera 116, and a GPS module 117. Needless to say, the sensors included in the sensor unit 110 are not limited thereto. For example, the sensor unit 110 does not have to include any of the above described sensors.

The acceleration sensor 111 is a sensor for sensing acceleration. The angular velocity sensor 112 is a sensor for sensing angular velocity. The geomagnetic sensor 113 is a sensor for sensing a direction and intensity of geomagnetic power. The barometric sensor is a sensor for sensing a magnitude of barometric pressure. The microphone 115 is a device for recording sounds around the signal output device 100. The camera 116 is a device for capturing images of surroundings of the signal output device 100. The GPS module 117 is a device for sensing a current position of the signal output device 100.

The storage unit 120 is implemented by a non-volatile memory such as a flash memory, and stores programs and various kinds of information for operating the signal output device 100. For example, the storage unit 120 stores an ID for uniquely identifying the vehicle 10. Note that, since the storage unit 120 is the non-volatile memory, it is possible to store the programs and the various kinds of information even when electric power supply from the electric power source unit 130 stops.

For example, the electric power source unit 130 is implemented by a primary battery or a secondary battery, and supplies electric power to the respective structural elements in the signal output device 100.

The measurement unit 140 measures behavior of the signal output device 100 by using the sensor unit 110. Specifically, the measurement unit 140 acquires sensing data from the sensor unit 110. The sensing data acquired by the measurement unit 140 is transmitted via the transmission unit 160.

The ID reader unit 150 reads out an ID that is stored in the storage unit 120 and that is used for uniquely identifying the vehicle 10. The ID read out by the ID reader unit 150 is transmitted via the transmission unit 160 in a manner that the ID is included in the beacon signal.

The transmission unit 160 outputs the beacon signal at a predetermined interval such as 10 seconds. The transmission unit 160 outputs the beacon signal by using magnetism, sound, light, vibration, or radio such as Wi-Fi or Bluetooth (registered trademark). The transmission unit 160 outputs the ID that the ID reader unit 150 has read out from the storage unit 120 in a manner that the ID is included in the beacon signal. In addition, the transmission unit 160 may output the sensing data acquired by the measurement unit 140.

Next, details of a functional configuration of the mobile terminal 200 will be described. The sensor unit 210 is a set of sensors that sense behavior of the mobile terminal 200, a surrounding environment of the mobile terminal 200, and the like. According to the embodiment, the sensor unit 210 includes an acceleration sensor 211, an angular velocity sensor 212, a geomagnetic sensor 213, a barometric sensor 214, a microphone 215, a camera 216, and a GPS module 217. Needless to say, the sensors included in the sensor unit 110 are not limited thereto. For example, the sensor unit 110 does not have to include any of the above-described sensors.

In addition to sensing of behavior of the mobile terminal 200, the sensor unit 210 can also sense behavior of the vehicle 10 such as acceleration, deceleration, or stop in the case where the mobile terminal 200 is placed in the vehicle 10.

The signal reception unit 220 receives the beacon signal output from the signal output device 100. When receiving the beacon signal, the signal reception unit 220 sends contents of the beacon signal to the ID determination unit 222. For example, the contents of the beacon signal received by the signal reception unit 220 includes an ID that is stored in the signal output device 100 and that is used for uniquely identifying the vehicle 10.

The ID determination unit 222 determines whether the ID that is included in the beacon signal received by the signal reception unit 220 and that is used for uniquely identifying the vehicle 10 is identical to an ID stored in the storage unit 240. In other words, the ID determination unit 22 determines whether a vehicle a user of the mobile terminal 200 is on is a vehicle that is specified in a contract with the insurance company or the like.

In the case where the ID that is included in the beacon signal received by the signal reception unit 220 and that is used for uniquely identifying the vehicle 10 is identical to the ID stored in the storage unit 240, the ID determination unit 222 starts measurement of behavior of the vehicle 10 by using the measurement unit 224 on the basis of the sensing performed by the sensor unit 210.

The measurement unit 224 measures behavior of the mobile terminal 200 by using the sensor unit 210 in accordance with a result of the determination performed by the ID determination unit 222. Specifically, the measurement unit 224 measures the behavior of the mobile terminal 200 by acquiring sensing data from the sensor unit 210. The sensor unit 210 is always measuring the behavior of the mobile terminal 200. On the other hand, the measurement unit 224 does not always acquire sensing data from the sensor unit 210, but acquires the sensing data from the sensor unit 210 in accordance with the result of the determination performed by the ID determination unit 222. By acquiring the sensing data from the sensor unit 210 in accordance with the result of the determination performed by the ID determination unit 222, it is possible for the measurement unit 224 to measure behavior of a vehicle the user of the mobile terminal 200 is on in the case where the vehicle is a vehicle specified in the contract with the insurance company or the like.

The state determination unit 226 determines a state of the vehicle 10 by using a result of measurement performed by the measurement unit 224. In the case where the mobile terminal 200 is in the vehicle 10, the result of sensing performed by the sensor unit 210 does not always represent the behavior of the vehicle 10. This is because sometimes a driver of the vehicle 10 or a fellow passenger operates the mobile terminal 200 while the vehicle 10 is traveling or stopping. In view of such a case, for example, the state determination unit 226 determines whether the mobile terminal 200 is operated while the vehicle 10 is traveling from the result of the measurement performed by the measurement unit 224. For example, the state determination unit 226 determines whether the mobile terminal 200 is in a still state from the result of the measurement performed by the measurement unit 224. The state determination unit 226 may determine whether the mobile terminal 200 is in a still state from sensing data obtained by the acceleration sensor 211, the angular velocity sensor 212, the geomagnetic sensor 213, the barometric sensor 214, or the like.

For example, the state determination unit 226 may determine that the driver or the fellow passenger has operated the mobile terminal 200 when there is a difference between velocity obtained from measurement of position information performed by the GPS module 217 and velocity obtained by integrating acceleration obtained through sensing performed by the acceleration sensor 211. Alternatively, in the case where the mobile terminal 200 can acquire sensing data from the signal output device 100, the state determination unit 226 may determine a state of the vehicle 10 from a difference between sensing data output from the signal output device 100 and sensing data output from the sensor unit 210.

When determining a state of the vehicle 10 by using a result of measurement performed by the measurement unit 224, the state determination unit 226 may determine whether the mobile terminal 200 is operated by the driver or the fellow passenger in the case where it is determined that the mobile terminal 200 is operated while the vehicle 10 is traveling or stopping. For example, in the case where it is determined that the mobile terminal 200 is operated while the vehicle 10 is traveling from a result of measurement performed by the measurement unit 224, the state determination unit 226 may determine that the mobile terminal 200 is operated by the fellow passenger. Subsequently, the state determination unit 226 may change contents to be displayed on the display unit 234 in accordance with the result of the determination after it is determined whether the mobile terminal 200 is operated by the driver or the fellow passenger.

The event detection unit 228 detects whether a specific event has occurred by using a result of measurement performed by the measurement unit 224. For example, the event detection unit 228 detects collision of the vehicle 10 as the specific event by using the result of measurement performed by the measurement unit 224. The event detection unit 228 can detect the collision of the vehicle 10 from rapid reduction in speed or occurrence of shock, for example.

When the specific event is detected, the event detection unit 228 instructs the UI unit 232 to cause the display unit 234 to perform display in accordance with details of the detected event. For example, when collision of the vehicle 10 is detected as the specific event by using the result of measurement performed by the measurement unit 224, the event detection unit 228 instructs the UI unit 232 to cause the display unit 234 to display a UI for making emergency contact with the insurance company.

The data recording unit 230 records the result of measurement performed by the measurement unit 224 in the storage unit 240. The result of the measurement that is performed by the measurement unit 224 and that is recorded by the data recording unit 230 is transmitted to the server 300 at a predetermined timing. The data recording unit 230 may record sensing data measured by the sensor unit 210 along with time of the measurement, or may record vehicle speed of the traveling vehicle 10, information on acceleration/deceleration, whether a gas pedal or a brake pedal is pressed, a traveling direction, altitude, whether shock is occurred, whether the vehicle is snaking, information on tilt with respect to three-dimensional axes that are obtained through analysis of the sensing data performed by the state determination unit 226.

The data recording unit 230 may always record the result of measurement performed by the measurement unit 224 in the storage unit 240. Alternatively, the data recording unit 230 may record the result of measurement performed by the measurement unit 224 in the storage unit 240 only in the case where a predetermined condition is satisfied, in other words, only in the case where the vehicle 10 seems to start traveling. For example, the data recording unit 230 may start recording of the result of measurement in accordance with occurrence of change in the sensing data included in the beacon signal received by the signal reception unit 220, or in accordance with reception of the beacon by the signal reception unit 220. Alternatively, for example, the data recording unit 230 may start recording of the result of measurement when it is detected that the mobile terminal 200 is in the still state. For example, it may be detected that the mobile terminal 200 is in the still state from sensing data obtained by the acceleration sensor 211, the angular velocity sensor 212, the geomagnetic sensor 213, the barometric sensor 214, or the like. Alternatively, for example, the data recording unit 230 may start recording of the result of measurement when predetermined change in barometric pressure is detected such as change in barometric pressure due to opening and closing of a door, traveling, or an air conditioner. Alternatively, for example, the data recording unit 230 may start recording of the result of measurement when predetermined sound generation is detected such as vehicle start sound, sound of an engine revving, traveling sound, wind noise, sound of opening or closing of a door, or the like. Alternatively, for example, the data recording unit 230 may start recording of the result of measurement when change in a position is detected such as traveling from a predetermined position such as a house or an office. Alternatively, for example, the data recording unit 230 may start recording of the result of measurement when change in cardinal directions or velocity is detected such as traveling from a parking lot.

Alternatively, the data recording unit 230 may stop recording of the result of measurement performed by the measurement unit 224 in the case where a predetermined condition is satisfied, in other words, in the case where the vehicle 10 seems to stop traveling. For example, the data recording unit 203 may stop recording of the result of measurement in accordance with the fact that change in the sensing data included in the beacon signal received by the signal reception unit 220 is stopped, or in accordance with the fact that reception of the beacon by the signal reception unit 220 is stopped. Alternatively, for example, the data recording unit 230 may stop recording of the result of measurement when operation on the mobile terminal 200 is detected. Alternatively, for example, the data recording unit 230 may stop recording of the result of measurement when predetermined change in barometric pressure is detected such as change in barometric pressure due to opening and closing of a door, traveling, or an air conditioner. Alternatively, for example, the data recording unit 230 may stop recording of the result of measurement when it is detected that predetermined sound is stopped such as vehicle start sound, sound of an engine revving, traveling sound, wind noise, sound of opening or closing of a door, or the like. Alternatively, for example, the data recording unit 230 may stop recording of the result of measurement when traveling to a predetermined position such as a house or an office is detected. Alternatively, for example, the data recording unit 230 may stop recording of the result of measurement when change in cardinal directions or velocity is detected such as parking in a parking lot.

The UI unit 232 generates a user interface to be displayed on the display unit 234. The UI unit 232 may function as an example of the display control unit according to the present disclosure. For example, as described above, when collision of the vehicle 10 is detected by the event detection unit 228, the UI unit 232 generates a user interface to be displayed on the display unit 234 for making emergency contact with the insurance company.

In addition, the UI unit 232 generates various kinds of user interfaces. Details of the various kinds of user interfaces will be described later. For example, on the display unit 234, the UI unit 232 displays information on driving of the vehicle 10, information on renewal of the vehicle insurance, information on a coupon that can be used in a facility near a place where a user gets out of the vehicle 10, information on a parking place or parking duration with regard to the vehicle 10, or the like.

The display unit 234 is a device configured to display various kinds of information. For example, the display unit 234 is implemented by a liquid crystal display, an organic EL display, or the like. The display unit 234 displays the user interface generated by the UI unit 232, for example.

The relation information collection unit 236 collects information related to the mobile terminal 200. For example, on the basis of position information of the mobile terminal 200, the relation information collection unit 236 collects information on a coupon that can be used in a facility near a place where the user of the mobile terminal 200 gets out of the vehicle 10, when the user of the mobile terminal 200 gets out of the vehicle 10. After collecting the information related to the mobile terminal 200 on the basis of the position information of the mobile terminal 200, the relation information collection unit 236 provides the collected information to the UI unit 232. On the basis of the information provided by the relation information collection unit 236, the UI unit 232 can generate a user interface for causing the display unit 234 to display the information on the coupon that can be used in the facility near the place where the user gets out of the vehicle 10.

Needless to say, the information collected by the relation information collection unit 236 is not limited thereto.

The communication unit 238 is a communication module that communicates with an outside in a wired/wireless manner. According to the embodiment, the communication unit 238 transmits, to the server 300, the result of the measurement that is performed by the measurement unit 224 and that is recorded by the data recording unit 230, for example.

The storage unit 240 is implemented by a non-volatile memory such as a flash memory, and stores programs and various kinds of information for operating the mobile terminal 200. For example, the storage unit 240 stores an ID specified in a contract with an insurance company. The ID determination unit 222 determines whether this ID is m identical to an ID stored in the signal output device 100. Note that, since the storage unit 240 is the non-volatile memory, it is possible to store the programs and the various kinds of information even when electric power supply from the battery (not illustrated) stops. The control unit 800 controls entire operation of the mobile terminal 200. For example, as described with reference to FIG. 3, the control unit 800 controls display on the display unit 234 and recording of data performed by the data recording unit 230.

According to the first embodiment of the present disclosure, the signal output device 100 and the mobile terminal 200 having the above described structural elements can acquire information on behavior of the vehicle 10 with high accuracy, the vehicle 10 serving as the moving body.

The functional configuration example of the signal output device 100 and the mobile terminal 200 according to the first embodiment of the present disclosure has been described with reference to FIG. 2. Next, an operation example of the mobile terminal 200 according to the first embodiment of the present disclosure will be described.

1.3. Operation Example

Figure 3:
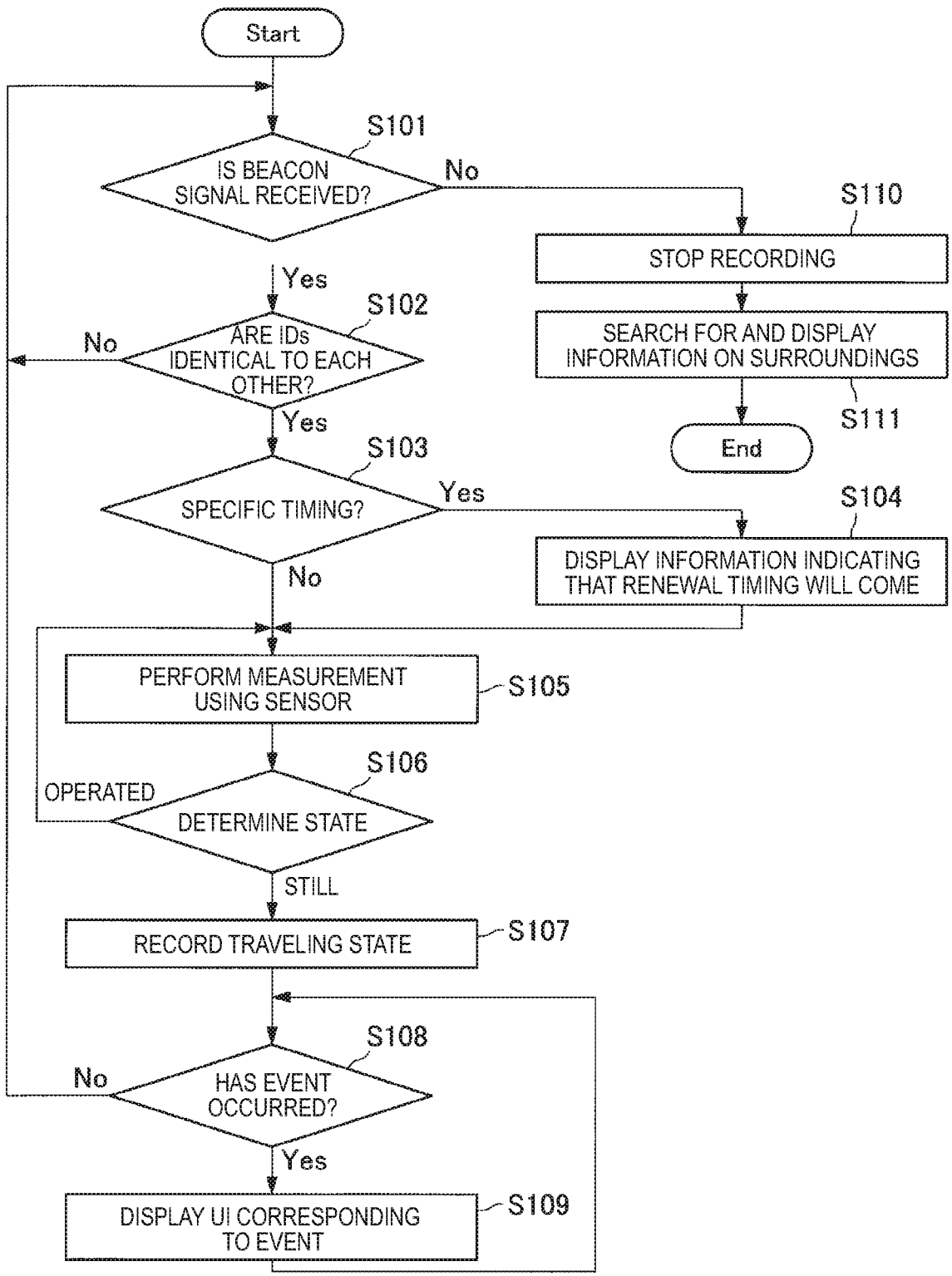
FIG. 3 is a flowchart illustrating an operation example of the mobile terminal 200 according to the embodiment.

FIG. 3 is a flowchart illustrating an operation example of the mobile terminal 200 according to the first embodiment of the present disclosure. FIG. 3 illustrates an operation example of the mobile terminal 200 at a time when behavior of the vehicle 10 is recorded through sensing performed by the sensor unit 210. Next, the operation example of the mobile terminal 200 according to the first embodiment of the present disclosure will be described with reference to FIG. 3.

The mobile terminal 200 determines whether the beacon signal is received from the signal output device 100 (Step S101). The determination in Step S101 is based on whether the signal reception unit 220 has received the beacon signal from the signal output device 100, for example.

In the case where the beacon signal is received from the signal output device 100 (YES in Step S101), the mobile terminal 200 determines whether an ID included in the beacon signal is identical to an ID stored in the storage unit 240 (Step S102). For example, the ID determination unit 222 determines whether these IDs are identical to each other in Step S102.

In the case where a result of the determination in Step S102 shows that the ID included in the received beacon signal is not identical to the ID stored in the storage unit 240 of the mobile terminal 200 (NO in Step S102), the mobile terminal 200 returns to a beacon signal reception determination process in Step S101. On the other hand, in the case where a result of the determination in Step S102 shows that the ID included in the received beacon signal is identical to the ID stored in the storage unit 240 of the mobile terminal 200 (YES in Step S102), the mobile terminal 200 determines whether a specific timing has come with reference to an automobile insurance renewal timing or the like stored in the storage unit 240 (Step S103). For example, the UI unit determines whether the specific timing has come in Step S103. For example, the mobile terminal 200 determines whether the specific timing such as the automobile insurance renewal timing has come in accordance with whether a predetermined time has elapsed from the last renewal, whether a next renewal timing will come within a predetermined time, or whether the vehicle has traveled a predetermined distance, on the basis of the past traveling distance or the automobile insurance renewal timing stored in the storage unit 240. In the case where a result of the determination in Step S102 shows that the ID included in the received beacon signal is not identical to the ID stored in the storage unit 240 of the mobile terminal 200, the control unit 800 may perform control such that the display unit of the mobile terminal 200 displays information indicating that the IDs are not identical to each other.

In the case where a result of the determination in Step S103 shows that the specific timing has come (YES in Step S103), the mobile terminal 200 displays information indicating that the automobile insurance renewal timing will come on the display unit 234 (Step S104). For example, the UI unit 232 performs the process in Step S104. As the information indicating that the automobile insurance renewal timing will come, the mobile terminal 200 may display a message such as "the automobile insurance renewal timing will come", a message that induces input of a value of an odometer, and a message that induces capturing of an image of the odometer.

Next, the mobile terminal 200 performs measurement using the sensor unit 210 (Step S105). For example, the measurement process in Step S105 is performed when the measurement unit 224 acquires sensing data output from the sensor unit 210.

Next, the mobile terminal 200 determines a state of the mobile terminal 20 by using the data obtained from the result of measurement in Step S105 (Step S106). For example, the state determination unit 226 performs the determination process in Step S106. In the case where the mobile terminal 200 is in the vehicle 10, the result of sensing performed by the sensor unit 210 does not always represent the behavior of the vehicle 10. This is because sometimes a driver of the vehicle 10 or a fellow passenger operates the mobile terminal 200 while the vehicle 10 is traveling or stopping. In view of such a case, for example, the mobile terminal 200 determines whether the mobile terminal 200 is operated while the vehicle 10 is traveling, by using the result of the measurement performed in Step S105.

In the case where it is determined that the mobile terminal 200 is operated by the driver or the fellow passenger as a result of the determination performed in Step S106, the mobile terminal 200 returns to the measurement using the sensor unit 210. In this case, a data recording process with regard to a traveling state of the vehicle 10 in Step S107 (to be described later) is not performed while it is determined that the mobile terminal 200 is operated by the driver or the fellow passenger. On the other hand, in the case where it is determined that the mobile terminal 200 is not operated by the driver or the fellow passenger as a result of the determination in Step S106, in other words, in the case where it is determined that the mobile terminal 200 is in the still state in the vehicle 10, the mobile terminal 200 causes the storage unit 240 to record a traveling state of the vehicle 10, which is information based on the sensing data output from the sensor unit 210 (Step S107). For example, the data recording unit 230 performs the recording process in Step S107. In Step S107, under the control of the control unit 800, the data recording unit 230 may record sensing data measured by the sensor unit 210 along with time of the measurement, or may record (1) vehicle speed of the traveling vehicle 10, (2) information on acceleration/deceleration, (3) whether a gas pedal or a brake pedal is pressed, (4) a traveling direction, (5) altitude, (6) whether shock to the vehicle 10 has occurred, (7) whether collision with another object has occurred, (8) whether the vehicle is snaking, (9) information on tilt with respect to three-dimensional axes, which are recognized by the state determination unit 226 computing the sensing data in a predetermined way, along with time of the measurement. For example, the data of (1) to (9) are determined on the basis of data output from the acceleration sensor and the angular velocity sensor that are included in the sensor unit 210. The process may proceeds to Step S107 and starts recording of a traveling state of the vehicle 10 in the storage unit 240, when it is determined that the mobile terminal 200 is not operated by the driver or the fellow passenger as a result of the determination in Step S106, in other words, it is determined that the mobile terminal 200 is in the still state in the vehicle 10, and it is detected that the vehicle 10 starts traveling on the basis of the sensing data output from the sensor unit 210.

As described above, the mobile terminal 200 may record the traveling state of the vehicle 10 only in the case where the predetermined condition is satisfied. In addition, as described above, the mobile terminal 200 may stop recording of the traveling state of the vehicle 10 in the case where the predetermined condition is no longer satisfied.

The mobile terminal 200 that is recording the traveling state of the vehicle 10 determines whether a predetermined event such as collision of the vehicle 10 has occurred during the recording on the basis of the sensing data output from the sensor unit 210 (Step S108). For example, the event detection unit 228 performs the determination process in Step S108.

In the case where it is determined that the predetermined event has occurred (YES in Step S108), the mobile terminal 200 causes the display unit 234 to display a user interface corresponding to the event such as a user interface for making emergency contact with the insurance company (Step S109). For example, the UI unit 232 generates the user interface to be displayed on the display unit 234. On the other hand, the mobile terminal 200 returns to the beacon signal reception determination process in Step S101 in the case where it is determined that the predetermined event has not occurred (NO in Step S108).

In the case where the beacon signal is not received from the signal output device 100 in the beacon signal reception determination process in Step S101 (NO in Step S101), the mobile terminal 200 determines that the user is away from the vehicle 10, and stops recording of the traveling state of the vehicle 10 (Step S110). Subsequently, the mobile terminal 200 searches for information on surroundings of a current position on the basis of information on the current position, and displays information based on the search result on the display unit 234 (Step S111). Examples of information based on the search result of the information on the surroundings of the current position include the coupon that can be used in a facility near the current position. In addition, in Step S101, it may be detected that the user with the mobile terminal has gotten out of the vehicle 10 on the basis of the sensing data output from the sensor unit 210 in addition to the beacon signal reception determination process. In this case, for example, it is detected that the beacon signal is not received from the signal output device 100, and it is detected that the mobile terminal is not in the still state or is held by the user who is walking, and then the process may proceed to Step S110 or Step S111.

Note that, in the case where a result of the determination in Step S102 shows that the ID included in the received beacon signal is not identical to the ID stored in the storage unit 240 of the mobile terminal 200, the mobile terminal 200 may cause the display unit 234 to display a new automobile insurance, such as recommendation of one-day automobile insurance.

Figure 4:
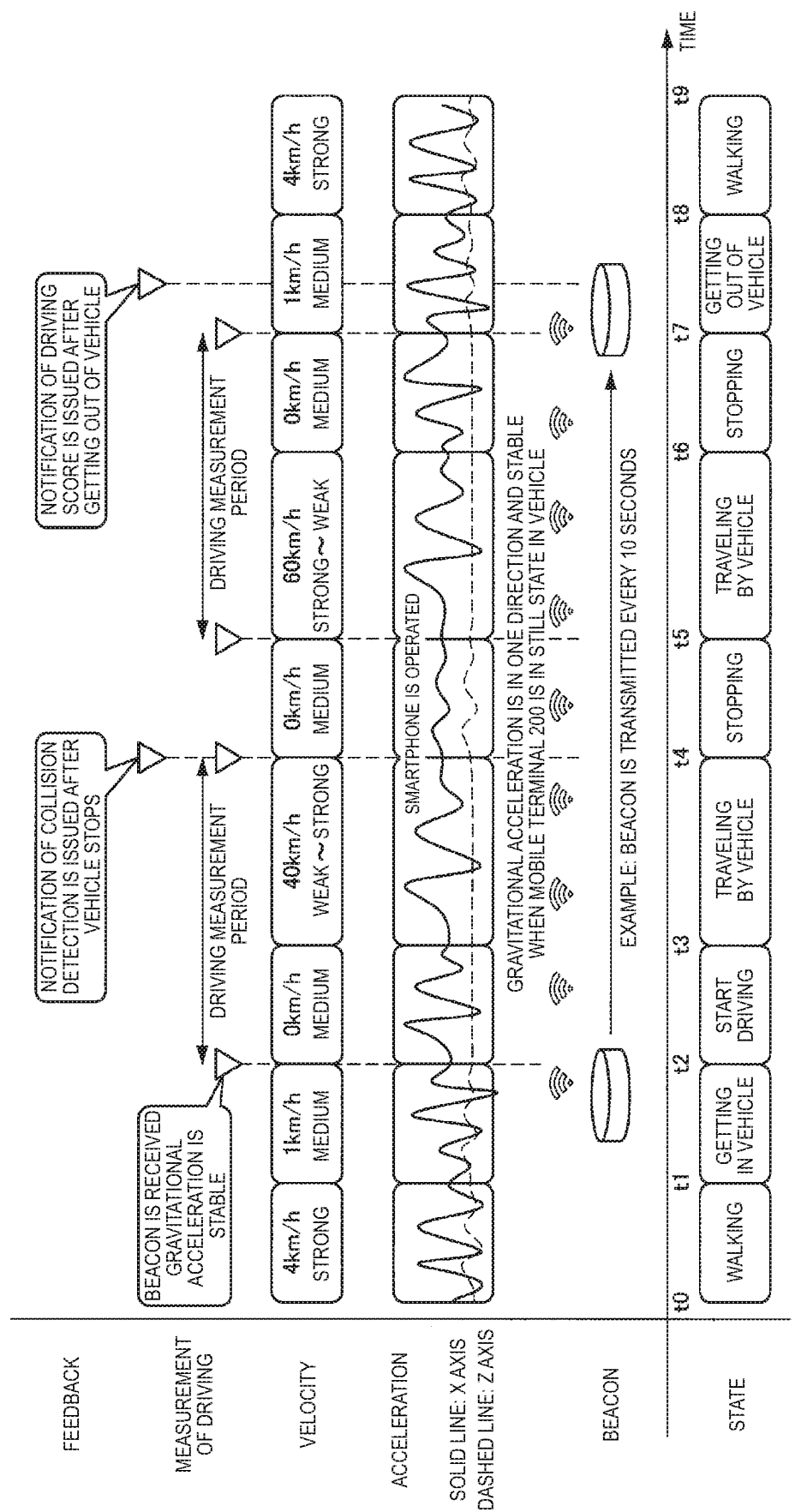
FIG. 4 is an explanatory diagram illustrating an example of a series of operations of the mobile terminal 200 according to the embodiment.

Next, an example of a series of operations of the mobile terminal 200 according to the first embodiment of the present disclosure will be described with reference to a diagram based on a time axis. FIG. 4 is an explanatory diagram illustrating the example of the series of operations of the mobile terminal 200 according to the first embodiment of the present disclosure.

In the section between time t0 to time t1 in FIG. 4, it is recognized that the mobile terminal 200 is moving at four kilometers per hour from sensing data, and it is possible to determine that the user is not in the vehicle 10 since the beacon signal is not received from the signal output device 100. In other words, it is possible for the mobile terminal 200 to determine that the user of the mobile terminal 200 is in a walking state during the section between the time t1 and the time t2.

In the section between the time t1 to time t2 in FIG. 4, it is recognized that the mobile terminal 200 is moving at one kilometer per hour from sensing data. Subsequently, since the mobile terminal 200 starts receiving the beacon signal from the signal output device 100, it is possible to determine that the user is in the vehicle 10.

In the section between the time t2 to time t3 in FIG. 4, it is recognized that the speed of the mobile terminal 200 is zero kilometer per hour from sensing data. Subsequently, since the mobile terminal 200 starts receiving the beacon signal from the signal output device 100, it is possible to determine that the user is in the vehicle 10. In other words, it is possible for the mobile terminal 200 to determine that the vehicle 10 is stopping during the section between the time t6 and the time t7 in FIG. 4. In addition, it is possible to determine that the mobile terminal 200 is in the still state in the vehicle 10 since the acceleration in the z-axis direction hardly changes, according to the sensing data. Since the mobile terminal 200 is in the still state in the vehicle 10, the mobile terminal 200 starts measurement of driving data by using the sensing data from the sensor unit 210.

In the section between the time t3 to time t4 in FIG. 4, it is recognized that the mobile terminal 200 is moving at 40 kilometers per hour from sensing data. Subsequently, since the mobile terminal 200 starts receiving the beacon signal from the signal output device 100, it is possible to determine that the user is in the vehicle 10. In other words, it is possible for the mobile terminal 200 to determine that the vehicle 10 is traveling during the section between the time t3 and the time t4 in FIG. 4. In addition, it is possible to determine that the mobile terminal 200 is in the still state in the vehicle 10 since the acceleration in the z-axis direction hardly changes, according to the sensing data. Since the mobile terminal 200 is in the still state in the vehicle 10, the mobile terminal 200 continues measurement of driving data by using the sensing data from the sensor unit 210.

In the section between the time t4 to time t5 in FIG. 4, it is recognized that the mobile terminal 200 is moving at 40 kilometers per hour from sensing data. Subsequently, since the mobile terminal 200 starts receiving the beacon signal from the signal output device 100, it is possible to determine that the user is in the vehicle 10. In other words, it is possible for the mobile terminal 200 to determine that the vehicle 10 is stopping during the section between the time t4 and the time t5 in FIG. 4. However, the mobile terminal 200 can determine that the mobile terminal 200 is not in the still state in the vehicle 10 since the acceleration in the z-axis direction has changed frequently, according to the sensing data. Since the mobile terminal 200 is not in the still state in the vehicle 10, it is possible to determine that the mobile terminal 200 is operated by the driver or the fellow passenger, and stop measuring driving data by using the sensing data from the sensor unit 210.

In the section between the time t5 to time t6 in FIG. 4, it is recognized that the mobile terminal 200 is moving at 60 kilometers per hour from sensing data. Subsequently, since the mobile terminal 200 starts receiving the beacon signal from the signal output device 100, it is possible to determine that the user is in the vehicle 10. In other words, it is possible for the mobile terminal 200 to determine that the vehicle 10 is traveling during the section between the time t5 and the time t6 in FIG. 4. In addition, the mobile terminal 200 can determine that the mobile terminal 200 is in the still state in the vehicle 10 since the acceleration in the z-axis direction hardly changes, according to the sensing data. Since the mobile terminal 200 is in the still state in the vehicle 10, the mobile terminal 200 restarts measurement of driving data by using the sensing data from the sensor unit 210.

In the section between the time t6 to time t7 in FIG. 4, it is recognized that the speed of the mobile terminal 200 is zero kilometer per hour from sensing data. Subsequently, since the mobile terminal 200 starts receiving the beacon signal from the signal output device 100, it is possible to determine that the user is in the vehicle 10. In other words, it is possible for the mobile terminal 200 to determine that the vehicle 10 is stopping during the section between the time t6 and the time t7 in FIG. 4. In addition, the mobile terminal 200 can determine that the mobile terminal 200 is in the still state in the vehicle 10 since the acceleration in the z-axis direction hardly changes, according to the sensing data. Since the mobile terminal 200 is in the still state in the vehicle 10, the mobile terminal 200 continues measurement of driving data by using the sensing data from the sensor unit 210.

In the section between the time t7 to time t8 in FIG. 4, it is recognized that the mobile terminal 200 is moving at one kilometer per hour from sensing data. Subsequently, since the mobile terminal 200 stops receiving the beacon signal from the signal output device 100, it is possible to determine that the user is in the outside of the vehicle 10. Therefore, the mobile terminal 200 stops measurement of driving data by using the sensing data from the sensor unit 210. Subsequently, in the section between time t7 and t8 in FIG. 4, the mobile terminal 200 may cause the display unit 234 to display a driving score calculated from sensing data in driving measurement periods between the time t2 and t4 and between the time t5 to t7.

In the section between time t8 to time t9 in FIG. 4, it is recognized that the mobile terminal 200 is moving at four kilometers per hour from sensing data, and it is possible to determine that the user is not in the vehicle 10 since the beacon signal is not received from the signal output device 100. In other words, it is possible for the mobile terminal 200 to determine that the user of the mobile terminal 200 is in a walking state during the section between the time t8 and the time t9. In the section between the time t8 and t9 in FIG. 4, the mobile terminal 200 may cause the display unit 234 to display relevant information such as a coupon that can be used in a facility near a current position.

Figure 5:
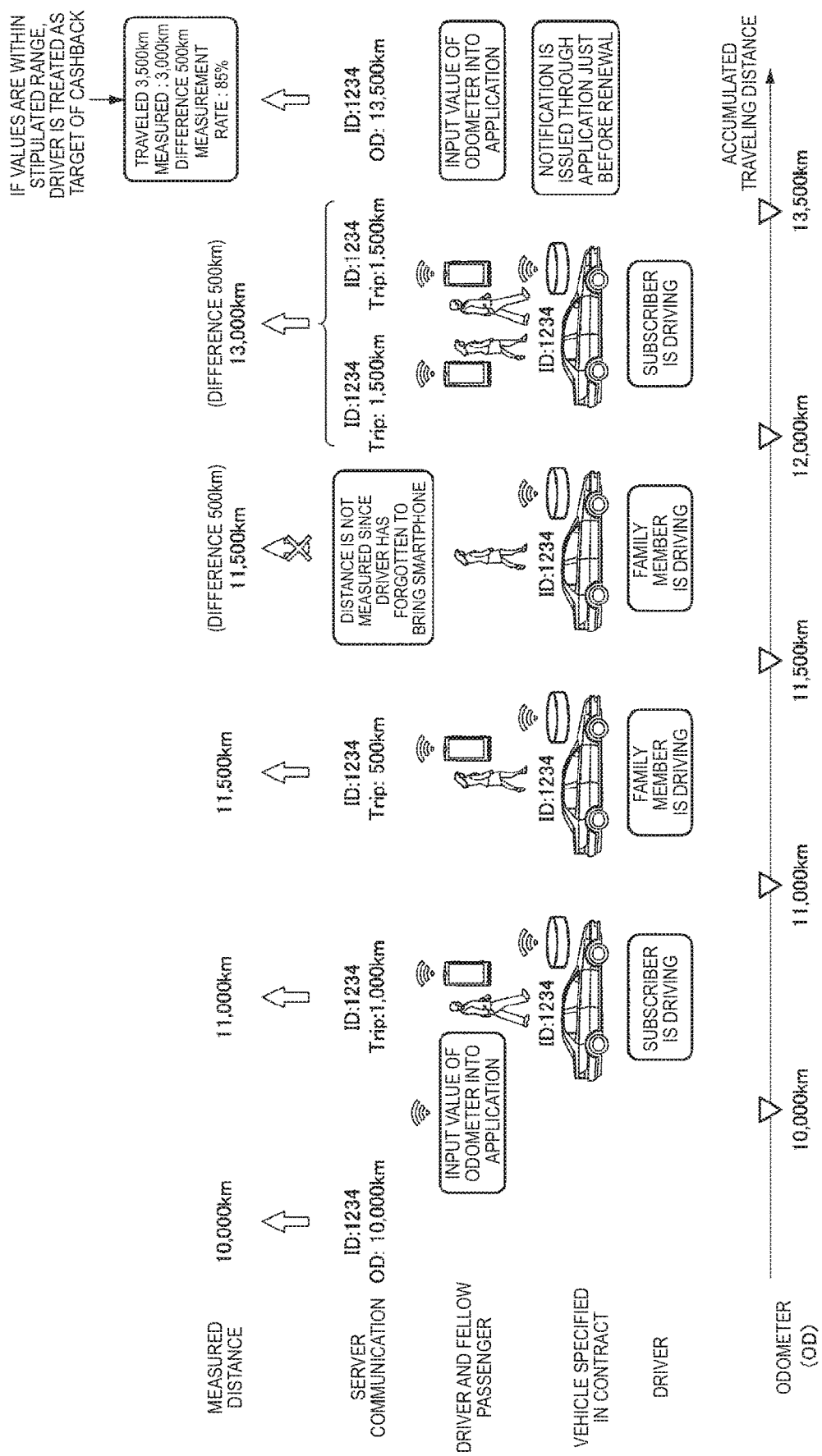
FIG. 5 is an explanatory diagram illustrating an example of a series of operations of the mobile terminal 200 according to the embodiment.

Next, an example of a series of operations of the mobile terminal 200 according to the first embodiment of the present disclosure will be described with reference to a diagram based on an axis of accumulated traveling distance. FIG. 5 is an explanatory diagram illustrating the example of the series of operations of the mobile terminal 200 according to the first embodiment of the present disclosure.

For example, it is assumed that the user of the mobile terminal 200 inputs a value of the odometer to a predetermined application when the accumulated traveling distance becomes 10000 km. The user of the mobile terminal 200 is a subscriber of a vehicle insurance with regard to the vehicle 10. Subsequently, the user with the mobile terminal 200 drives the vehicle 10 through 1000 km. Subsequently, a family member of the subscriber of the vehicle insurance with regard to the vehicle 10 drives the vehicle 10 through 500 km while the family member is carrying the mobile terminal 200.

Subsequently, it is assumed that although the family member of the subscriber of the vehicle insurance with regard to the vehicle 10 has driven the vehicle 10 through 500 km, the family member has forgotten to bring the mobile terminal 200. Accordingly, the actual traveling distance is different from the traveling distance measured by the mobile terminal 200 by 500 km.

Subsequently, the subscriber of the vehicle insurance with regard to the vehicle 10 drives the vehicle 10 through 1500 km while the subscriber is carrying the mobile terminal 200 and the family member is also in the vehicle 10. Subsequently, it is assumed that the user of the mobile terminal 200 inputs a value of the odometer to the predetermined application when the accumulated traveling distance becomes 13500 km since the vehicle insurance renewal timing will come. The user of the mobile terminal 200 is the subscriber of the vehicle insurance with regard to the vehicle 10. Accordingly, although the actual traveling distance is 3500 km, the traveling distance measured by the mobile terminal 200 is 3000 km. In the traveling period of 3500 km, a distance rate of the measurement using the mobile terminal 200 is about 86%. If this value is within a range in which the subscriber can get cashback according to the contract with the insurance company, the subscriber of the vehicle insurance of the vehicle 10 can get cashback from the insurance company.

When the mobile terminal 200 measures behavior of the vehicle 10, it is assumed that there are three cases including a case where the subscriber himself/herself drives, a case where a family member of the subscriber drives, and a case where the subscriber and his/her family member are on the same vehicle. In the case where the subscriber himself/herself drives, the ID stored in the mobile terminal 200 is identical to the ID included in the beacon signal output from the signal output device 100. In the case where the family member of the subscriber drives, it is also possible for a mobile terminal 200 carried by the family member to recognize that the family member is driving by storing an ID in the mobile terminal 200 carried by the family member in advance. This ID is the same as the ID stored in the mobile terminal 200 owned by the subscriber. In addition, in the case where the subscriber and his/her family member are on the same vehicle, in other words, in the case where different mobile terminals 200 in which the same ID is stored are in the vehicle 10, pieces of information collected by the different mobile terminals 200 having the same ID are kept from overlapping. For example, IDs for identifying the users of the mobile terminals 200 may be prepared in addition to the ID for identifying the vehicle 10, and only behavior of the vehicle 10 measured by the mobile terminal 200 in which the ID of the subscriber is stored may be recorded in the server 300.

Next, an example of a user interface that is displayed by the mobile terminal 200 on the display unit 234 will be described.

Figure 6:
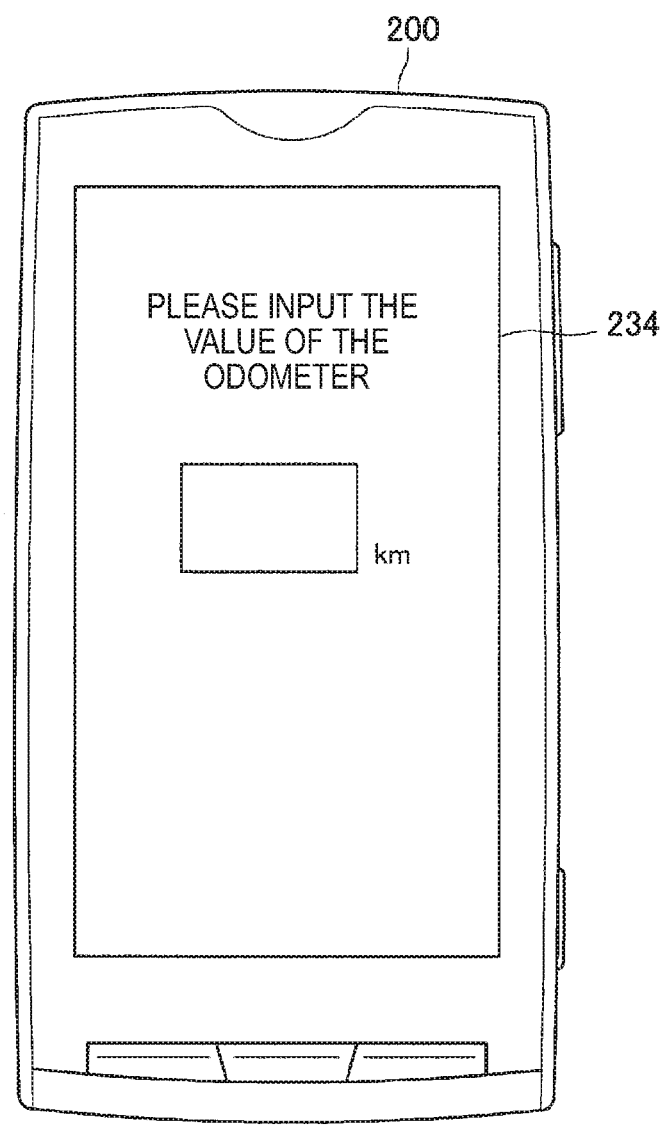
FIG. 6 is an explanatory diagram illustrating an example of a user interface that is displayed by the mobile terminal 200 on a display unit 234.

FIG. 6 is an explanatory diagram illustrating an example of a user interface that is displayed by the mobile terminal 200 on the display unit 234. FIG. 6 is the example of the user interface to which a value of the odometer is input at the vehicle insurance renewal timing or the like.

Figure 7:
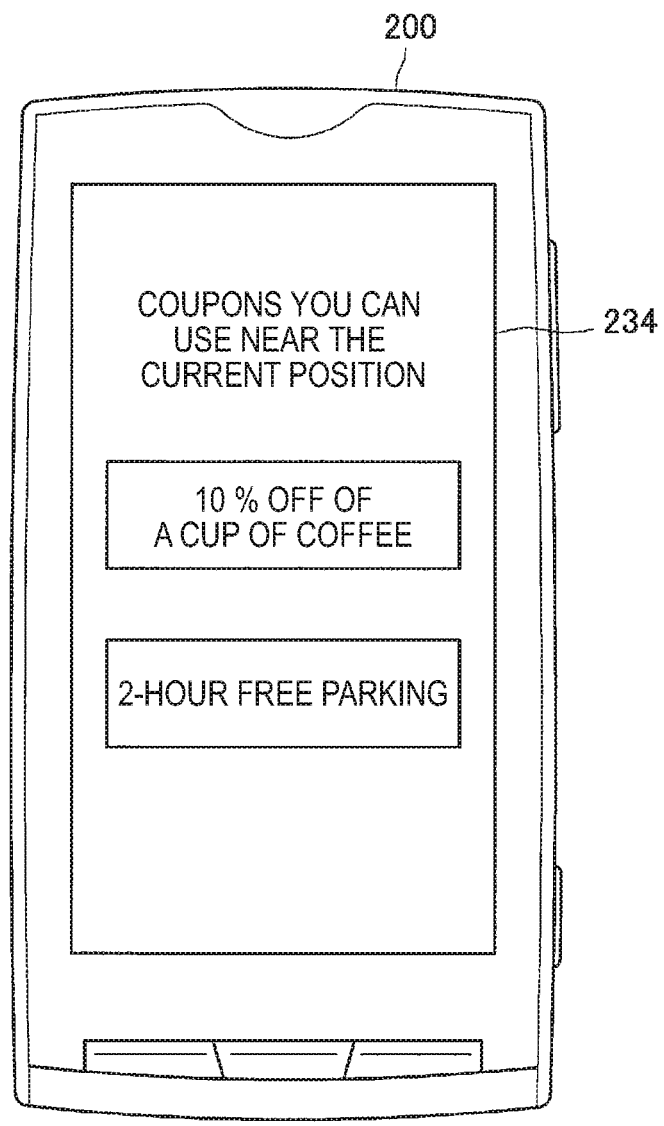
FIG. 7 is an explanatory diagram illustrating an example of a user interface that is displayed by the mobile terminal 200 on the display unit 234.

FIG. 7 is an explanatory diagram illustrating an example of a user interface that is displayed by the mobile terminal 200 on the display unit 234. FIG. 7 is the example of the user interface that automatically displays coupons that can be used in nearby facilities when the user with the mobile terminal 200 gets out of the vehicle 10.

Figure 8:
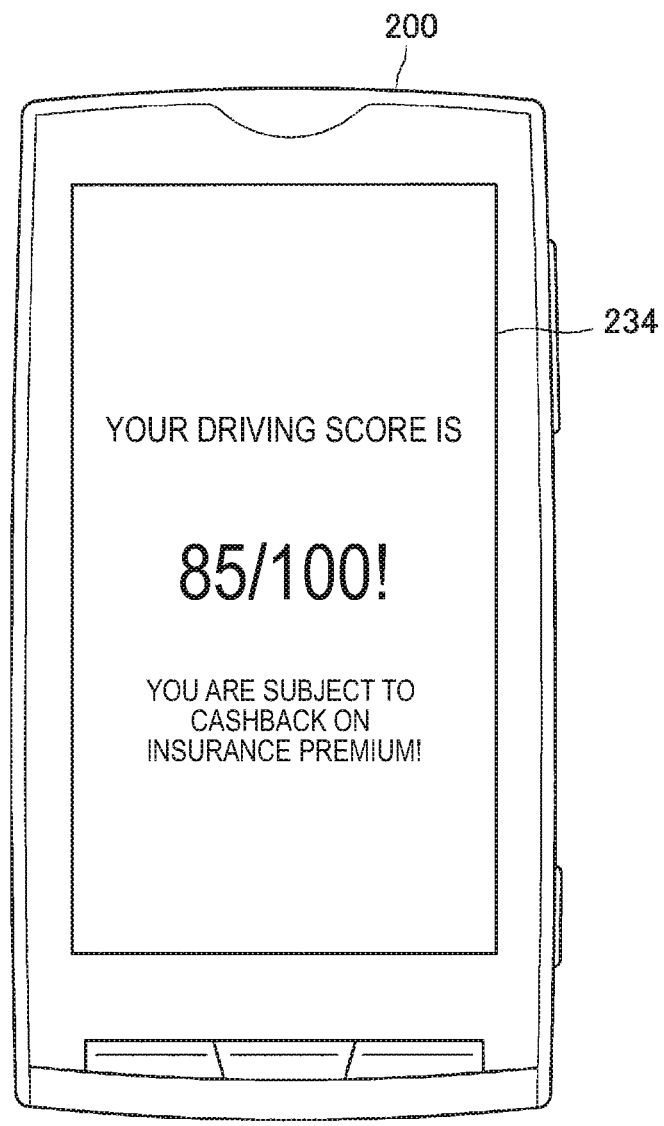
FIG. 8 is an explanatory diagram illustrating an example of a user interface that is displayed by the mobile terminal 200 on the display unit 234.

FIG. 8 is an explanatory diagram illustrating an example of a user interface that is displayed by the mobile terminal 200 on the display unit 234. FIG. 8 is the example of the user interface that displays a driving score of the user with the mobile terminal 200 when the user with the mobile terminal 200 drives the vehicle 10.

Figure 9:
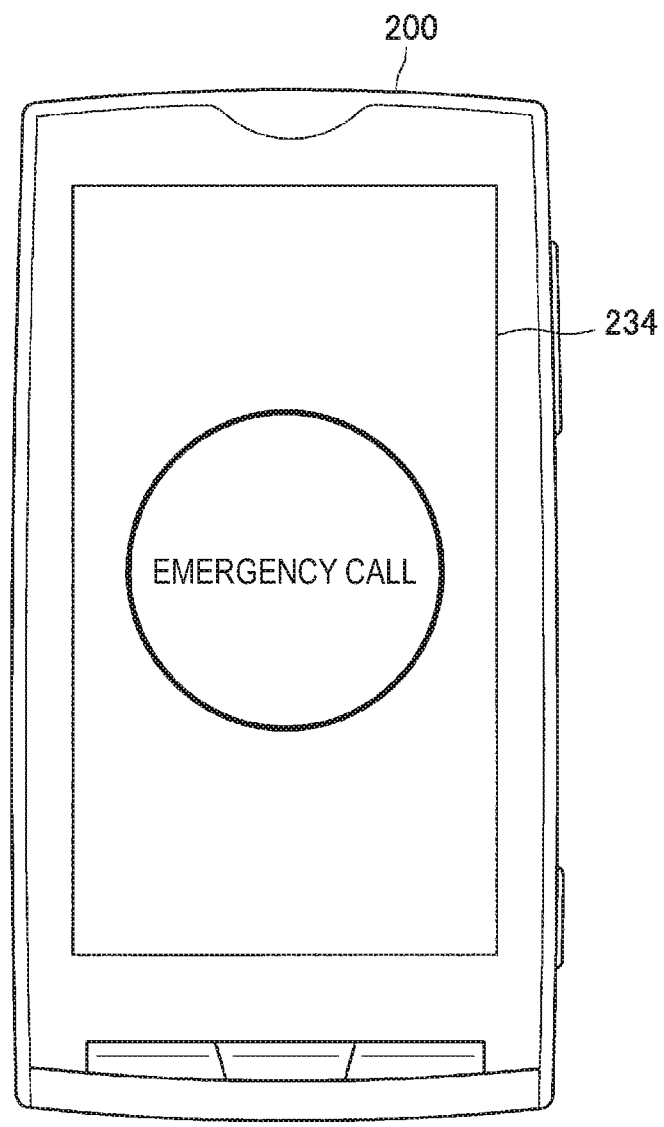
FIG. 9 is an explanatory diagram illustrating an example of a user interface that is displayed by the mobile terminal 200 on the display unit 234.

FIG. 9 is an explanatory diagram illustrating an example of a user interface that is displayed by the mobile terminal 200 on the display unit 234. FIG. 9 is the example of the user interface that is automatically displayed for making emergency contact with the insurance company when the user with the mobile terminal 200 crashes while driving the vehicle 10.

Figure 10:
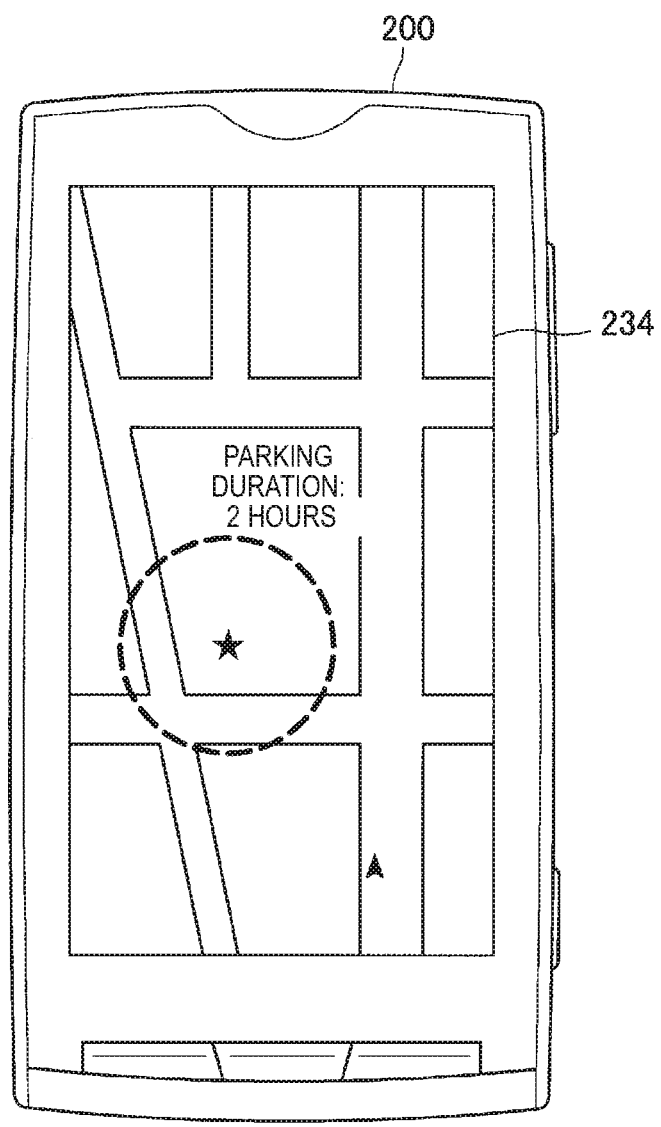
FIG. 10 is an explanatory diagram illustrating an example of a user interface that is displayed by the mobile terminal 200 on the display unit 234.

FIG. 10 is an explanatory diagram illustrating an example of a user interface that is displayed by the mobile terminal 200 on the display unit 234. FIG. 10 is the example of the user interface that displays a parking position and parking duration when the user with the mobile terminal 200 parks the vehicle 10.

As described above, the mobile terminal 200 can display various kinds of user interfaces on the display unit 234 by measuring the behavior of the vehicle 10 by using the sensing data output from the sensor unit 210. Needless to say, the user interface displayed by the mobile terminal 200 on the display unit 234 is not limited thereto.

For example, FIG. 9 illustrates the example of the user interface for making emergency contact with the insurance company when the event has occurred such as the user with the mobile terminal 200 crashes while driving the vehicle 10. However, the mobile terminal 200 may display various kinds of user interfaces in accordance with a position of the mobile terminal 200 or a time slot in which an event has occurred. For example, in the case where the mobile terminal 200 is in an area with no public transportation, the mobile terminal 200 may automatically display a user interface for calling a taxi or the like. Alternatively, for example, in the case where an even has occurred in the night, the mobile terminal 200 may automatically display a user interface for booking a hotel.

1.4. Modification

In the above described embodiment, the mobile terminal 200 may record the result of measurement performed by the measurement unit 224 in the storage unit 240 only in the case where a condition that the vehicle 10 seems to start traveling is satisfied. Examples of the condition that the vehicle 10 seems to start traveling may further include wearing of a seat belt, operation performed on an ignition key or a start button, pressing of the gas pedal, and the like. Information on wearing of a seat belt, operation performed on an ignition key or a start button, pressing of the gas pedal, and the like can be directly acquired from the vehicle 10.

Figure 11:
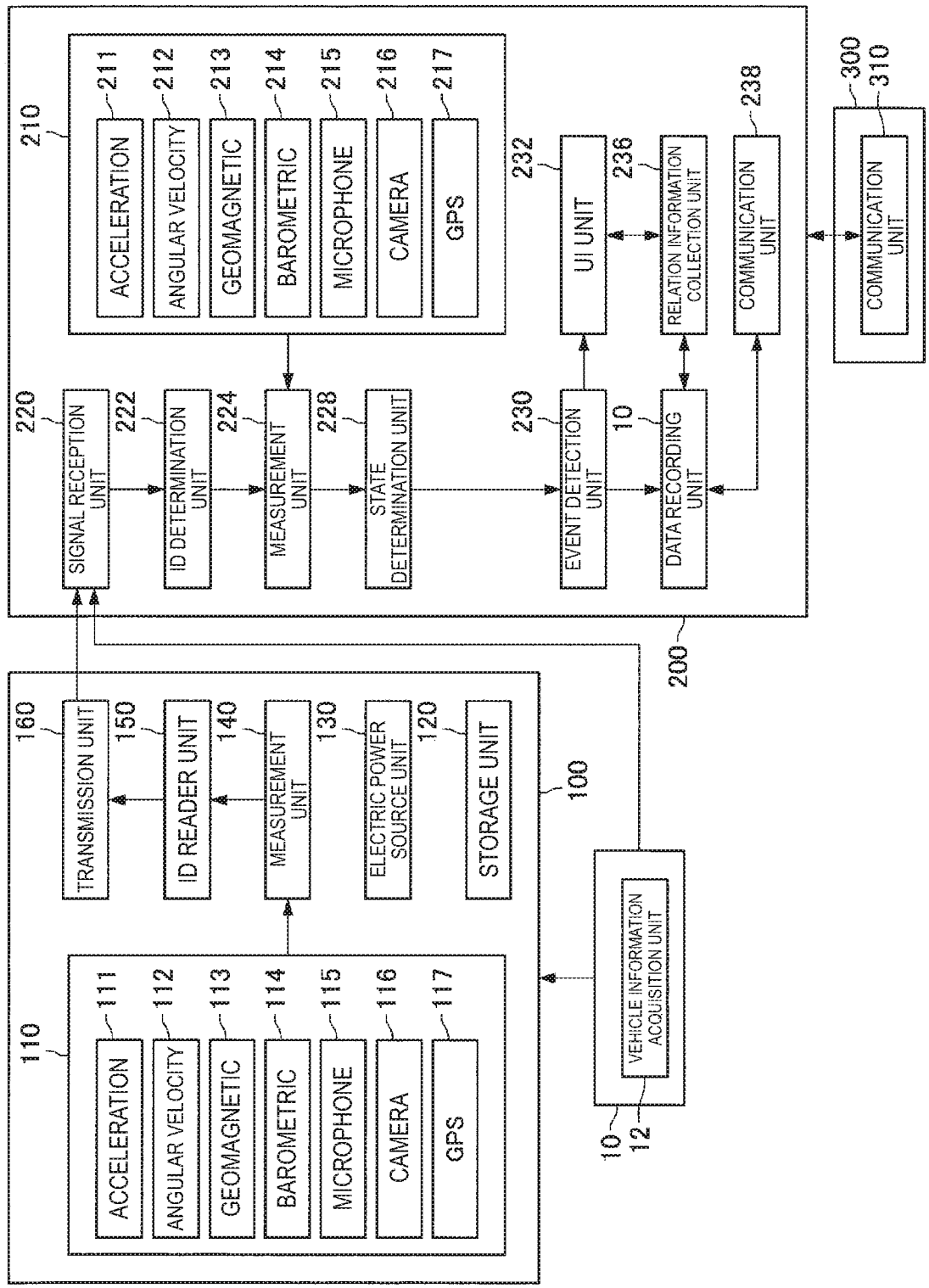
FIG. 11 is an explanatory diagram illustrating a modification of the embodiment.

FIG. 11 is an explanatory diagram illustrating a modification of the first embodiment of the present disclosure. FIG. 11 illustrates a system configuration example in the case where the mobile terminal 200 records the result of measurement performed by the measurement unit 224 in the storage unit 240 by acquiring a state of the vehicle 10 from the vehicle 10.

The vehicle 10 includes the vehicle information acquisition unit 12. For example, the vehicle information acquisition unit 12 acquires various kinds of information related to the vehicle 10, such as information on wearing of a seat belt, operation performed on an ignition key or a start button, pressing of the gas pedal, brake pedal, and the like. For example, the vehicle 10 outputs the information acquired by the vehicle information acquisition unit 12 to the signal output device 100 through on-board diagnostics (OBD) or outputs the information to the mobile terminal 200 through wireless communication. In the case where the signal output device 100 acquires information acquired by the vehicle information acquisition unit 12, the signal output device 100 outputs the beacon signal including the acquired information.

As described above, by receiving the information acquired by the vehicle information acquisition unit 12, it is possible for the mobile terminal 200 to use the information acquired by the vehicle information acquisition unit 12 and determine start and stop of traveling of the vehicle 10. For example, if it is recognized that the driver is wearing the seat belt from the information acquired by the vehicle information acquisition unit 12, the measurement unit 224 in the mobile terminal 200 may start measurement at a time when the driver starts wearing the seat belt. Alternatively, for example, if it is recognized that the driver has took off the seat belt from the information acquired by the vehicle information acquisition unit 12, the measurement unit 224 in the mobile terminal 200 may stop measurement at a time when the driver starts wearing the seat belt.

As described above, according to the first embodiment of the present disclosure, there is provided the mobile terminal 200 configured to measure behavior of the vehicle 10 by using sensing data output from the sensor unit 210 in accordance with reception of a beacon signal from the signal output device 100 placed in the vehicle 10.

Even when vehicles have the same traveling distance, they have different risks of accidents depending on traveling roads, traveling situations, speeds, time slots, degrees of acceleration/deceleration, or the like. Accordingly, by measuring behavior of the vehicle 10 on the basis of the sensing data output from the sensor unit 210 in the mobile terminal 200, the insurance company can provide services to subscribers, such as discount on an insurance premium, cashback to the driver, or increase in insurance premium, depending on the driving situation of the vehicle 10.

For example, in accordance with a result of the measurement performed by the measurement unit 200, the insurance company may increase the insurance premium in the case where the vehicle 10 has traveled a general road. On the other hand, the insurance company may discount the insurance premium in the case where the vehicle 10 has traveled a freeway.

For example, in accordance with a result of the measurement performed by the measurement unit 200, the insurance company may increase the insurance premium in the case where the traveling speed of the vehicle 10 has changed a lot. On the other hand, the insurance company may discount the insurance premium in the case where the traveling speed of the vehicle 10 has changed slightly.

For example, in accordance with a result of the measurement performed by the measurement unit 200, the insurance company may increase the insurance premium in the case where the traveling speed of the vehicle 10 has exceeded 100 km/h. On the other hand, the insurance company may discount the insurance premium in the case where the traveling speed of the vehicle 10 has been within a range of 0 km/h to 50 km/h.

For example, in accordance with a result of the measurement performed by the measurement unit 200, the insurance company may increase the insurance premium in the case where traveling time slots of the vehicle 10 include night such as a time slot from 20:00 to 06:00 and commuting time such as a time slot from 06:00 to 09:00 or from 17:00 to 20:00. On the other hand, the insurance company may discount the insurance premium in the case where the traveling time slots of the vehicle 10 include a low-traffic time slot such as a time slot from 09:00 to 17:00.

For example, in accordance with a result of the measurement performed by the measurement unit 200, the insurance company may increase the insurance premium in the case where the vehicle 10 has traveled with an inter-vehicle time of three seconds or less. On the other hand, the insurance company may discount the insurance premium in the case where the vehicle 10 has traveled with an inter-vehicle time of more than three seconds.

As described above, the insurance company can provide services to subscribers, such as discount on an insurance premium, cashback to the driver, or increase in insurance premium, depending on behavior of the vehicle 10 measured by the mobile terminal 200.

2. SECOND EMBODIMENT

Next, a second embodiment of the present disclosure will be described. The on-board diagnostics function of an automobile is one of the functions programmed in an electrical control unit (ECU) attached to each unit of the automobile. Since the diagnostics function is implemented on the car itself, it is referred to as on-board diagnostics function. In addition, it is also abbreviated to OBD, which is the acronym of the term "On-Board Diagnostics" representing the on-board diagnostics function of an automobile in English.

For example, when each sensor and each actuator included in a fuel injection system of an engine malfunction, the ECU of the engine stores the malfunction and informs a driver of the malfunction by turning on a warning lamp on an instrument panel.

The OBD2 uses connection connectors called data link couplers (DLCs) having pins shaped and assigned in the same way irrespective of makers, and the same trouble codes to implement a function of turning on a warning light on the instrument panel in the same way at the time of trouble.

The trouble codes of the OBD2 is referred to as diagnostic trouble cord (DTC), and are each constituted of a single alphabet and a four-digit number. The use of four-digit numbers allows as many as ten thousand trouble codes from 0000 to 9999 to be set.

In order to read out a DTC of the OBD2, there must be devices that communicate with a microcontroller in the ECU, read out the stored DTC, and display the read-out DTC on a display. These devices are referred to as scan tools. The scan tools are used to inspect, overhaul, and repair vehicles at service shops, repair shops, and the like of automobiles. They are, however, professional devices, so that they are not used much among general drivers.

There are today small scan tools that include no display devices or batteries, but are capable of a wireless or wired connection. However, in order to use the scan tools, it is necessary to attach the scan tools to vehicles and to constantly keep communication devices, display devices, and the like such as smartphones and PCs connected. For a constant connection, users have to bring smartphones, PCs, and the like into vehicles, to start the corresponding applications, and then to connect the smartphones, the PCs, and the like whenever the users use the vehicles, sacrificing convenience.

Meanwhile, drivers would like to promptly solve trouble by using the error information on vehicles, and to know their driving situations by using information such as the actual traveling velocity and acceleration. When involved in trouble, drivers know what to do such as rescuing an injured person, calling police and an insurance company, and confirming information on the other person involved in the trouble, but it is pretty difficult for the drivers to smoothly do what to do in such an uneasy situation just after the trouble. It is thus necessary to ease the drivers' anxiety at the time of trouble and to support the drivers for a smooth solution.

Specifically, there is provided a method for automatically detecting, when a crash occurs, the crash by using a change in velocity and information from an acceleration sensor and automatically making an emergency call. In addition, for example, there is provided a method for arranging appropriate roadside assistance and repair shop by using vehicle information when an error lamp of an engine is turned on. In addition, for example, there is provided a method for using a driving situation to compute an insurance premium and the vehicle price of a used car, etc. Scan tools necessary to achieve such methods need to be small and capable of easily confirming necessary information even when detached from vehicles, further preventing data from being falsified, and operating without a constant connection with smartphones or the like. Furthermore, it is also necessary to implement a function of promptly issuing a notification of a malfunction condition at the time of trouble and emergently solving the trouble.

Therefore, the second embodiment of the present disclosure includes a drive counter configured to acquire information on the on-board diagnostics function of the vehicle and sense behavior of the vehicle 10 by using an internal sensor.

Figure 12:
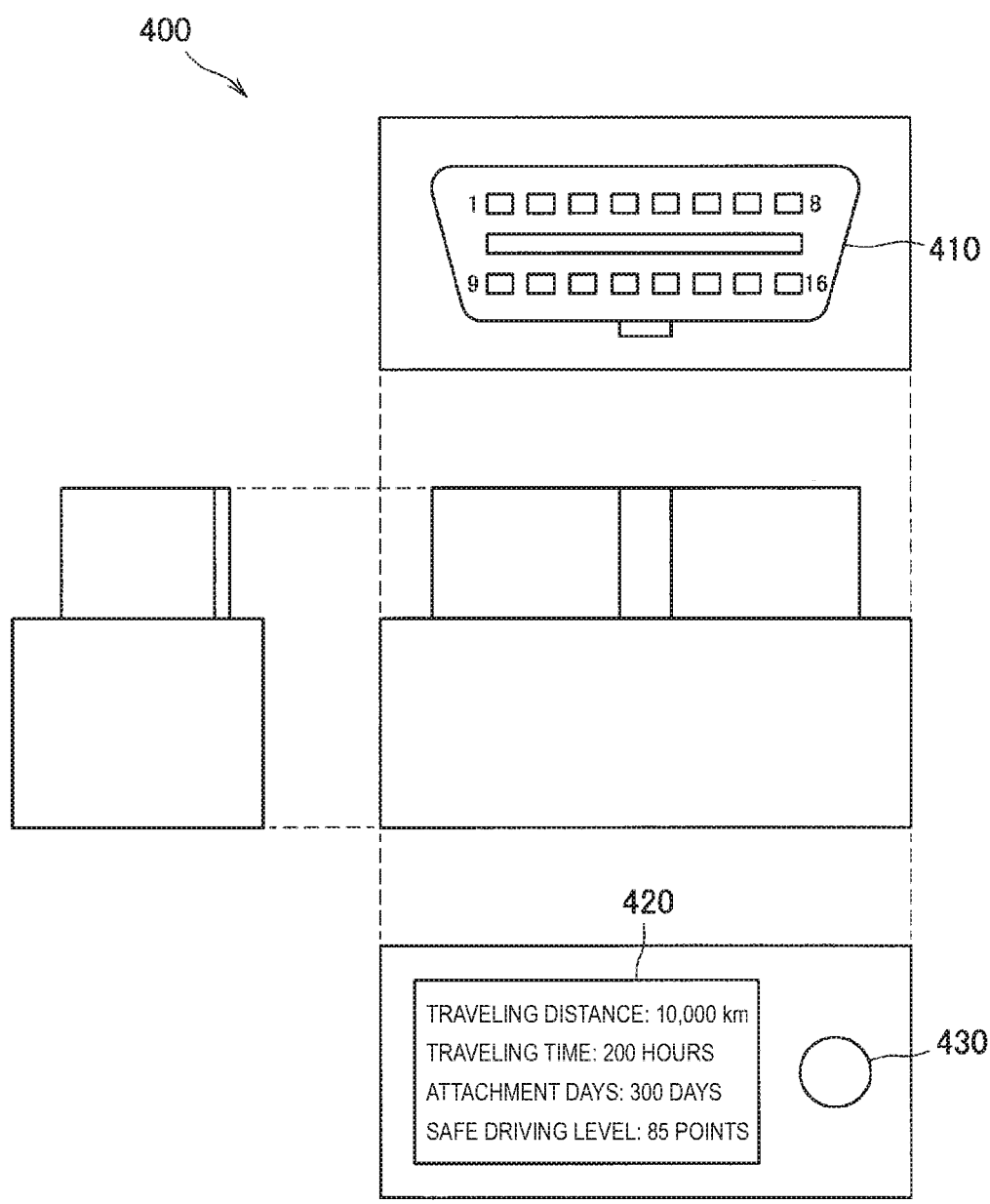
FIG. 12 is an explanatory diagram illustrating an example of appearance of a drive counter 400 according to a second embodiment of the present disclosure.

FIG. 12 is an explanatory diagram illustrating an example of appearance of a drive counter 400 according to the second embodiment of the present disclosure. The drive counter 400 according to the second embodiment of the present disclosure includes a data link coupler (DTC) terminal 410, a display unit 420, and an operation button 430. The DTC terminal 410 reads out the OBD2. In addition, the drive counter 400 according to the second embodiment of the present disclosure further includes a sensor, a non-volatile memory, a clock function, a battery, a communication unit, and the like therein.

Information from the on-board diagnostics function (OBD/OBD2) of an automobile is acquired for the vehicle condition of the automobile via the DTC terminal 410 through a connection connector such as the DTC. In addition, a sensor built in the drive counter 400 includes the acceleration sensor, the gyro sensor, the geomagnetism sensor, voltage detection sensor, a temperature sensor, barometric pressure/altitude sensor, humidity sensor, a GPS, a microphone, or the like, and acquires the information on the vehicle situation by using these sensors. Subsequently, the attachment time for which the drive counter 400 is attached to the vehicle, the traveling distance, the traveling time, the average velocity, the safe driving level, the crash information, the error information, or the like is computed on the basis of the vehicle states acquired from the drive counter 400. The drive counter 400 performs a falsification preventing process, for example, by converting the computed information into a hash value as necessary, and then stores the computed information in the non-volatile memory. In addition, since the drive counter 400 includes the battery, functions of the drive counter 400 such as the clock function can be used alone even when the drive counter 400 is detached from the vehicle. In addition, the drive counter 400 can output information to PCs, a smartphones, and the like through wired communication such as USBs and wireless communication such as Bluetooth, Wi-Fi, NFC, and beacon transmission. In addition, the drive counter 400 can be used without a PC, a smartphone, or the like, by outputting information to the display unit 420 such as a liquid crystal display or electronic paper. The device includes a mechanism capable of using information output from the drive counter 400 to compute an insurance premium and a vehicle price, to analyze the cause of trouble or the like, and further confirming that the output information is not falsified.

Figure 13:
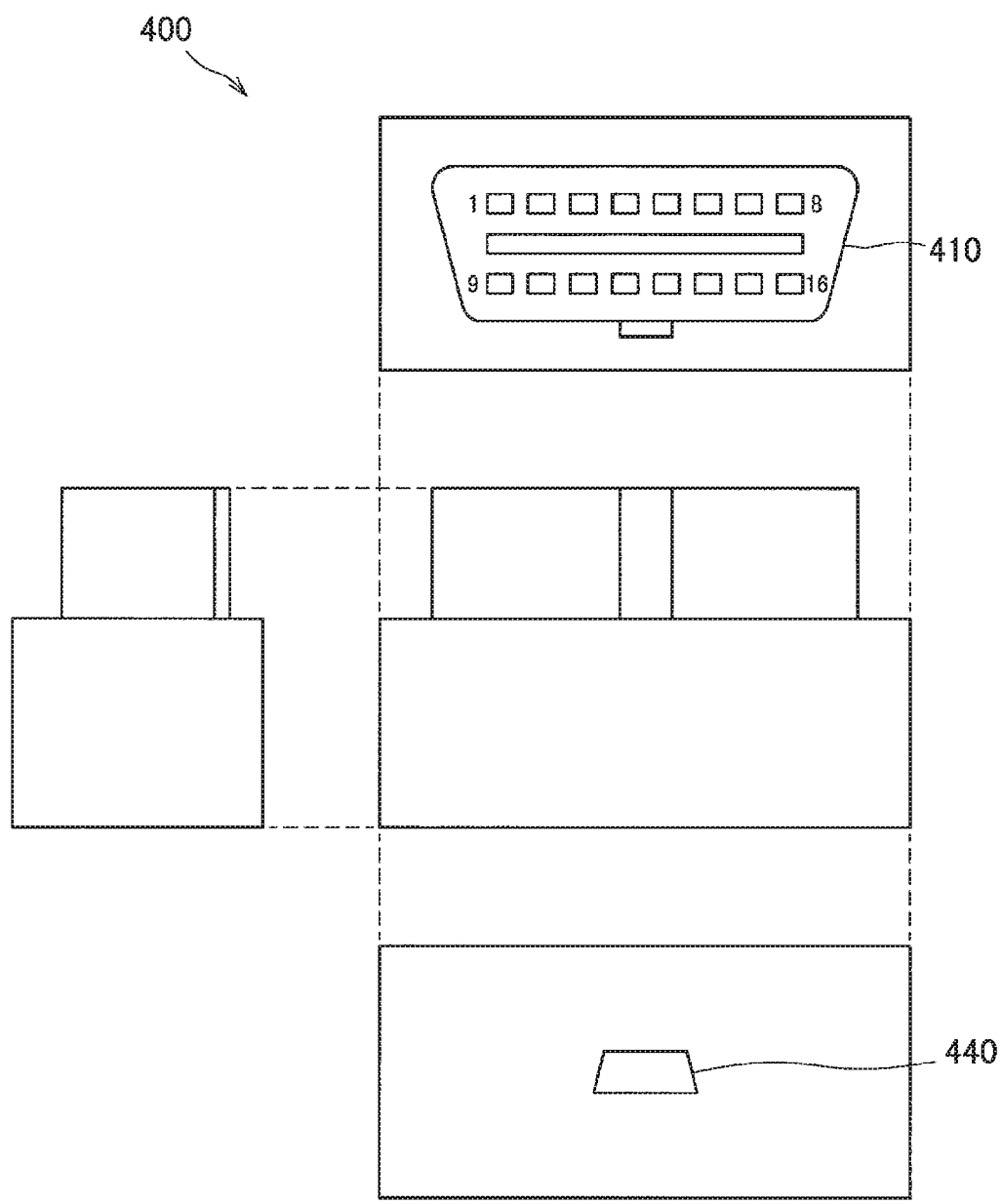
FIG. 13 is an explanatory diagram illustrating an example of appearance of the drive counter 400 according to the embodiment.

FIG. 13 is an explanatory diagram illustrating an example of appearance of a drive counter 400 according to the second embodiment of the present disclosure. The drive counter 400 illustrated in FIG. 13 includes a USB terminal 440. Since the drive counter 400 illustrated in FIG. 13 includes the USB terminal 440, it is possible to perform wired communication and supply an electric power via the USB. Therefore, it is possible to confirm information on the drive counter by using a PC, a smartphone, or the like not only when the drive counter 400 illustrated in FIG. 13 is attached to the vehicle, but also when the drive counter 400 is detached from the vehicle.

Figure 14:
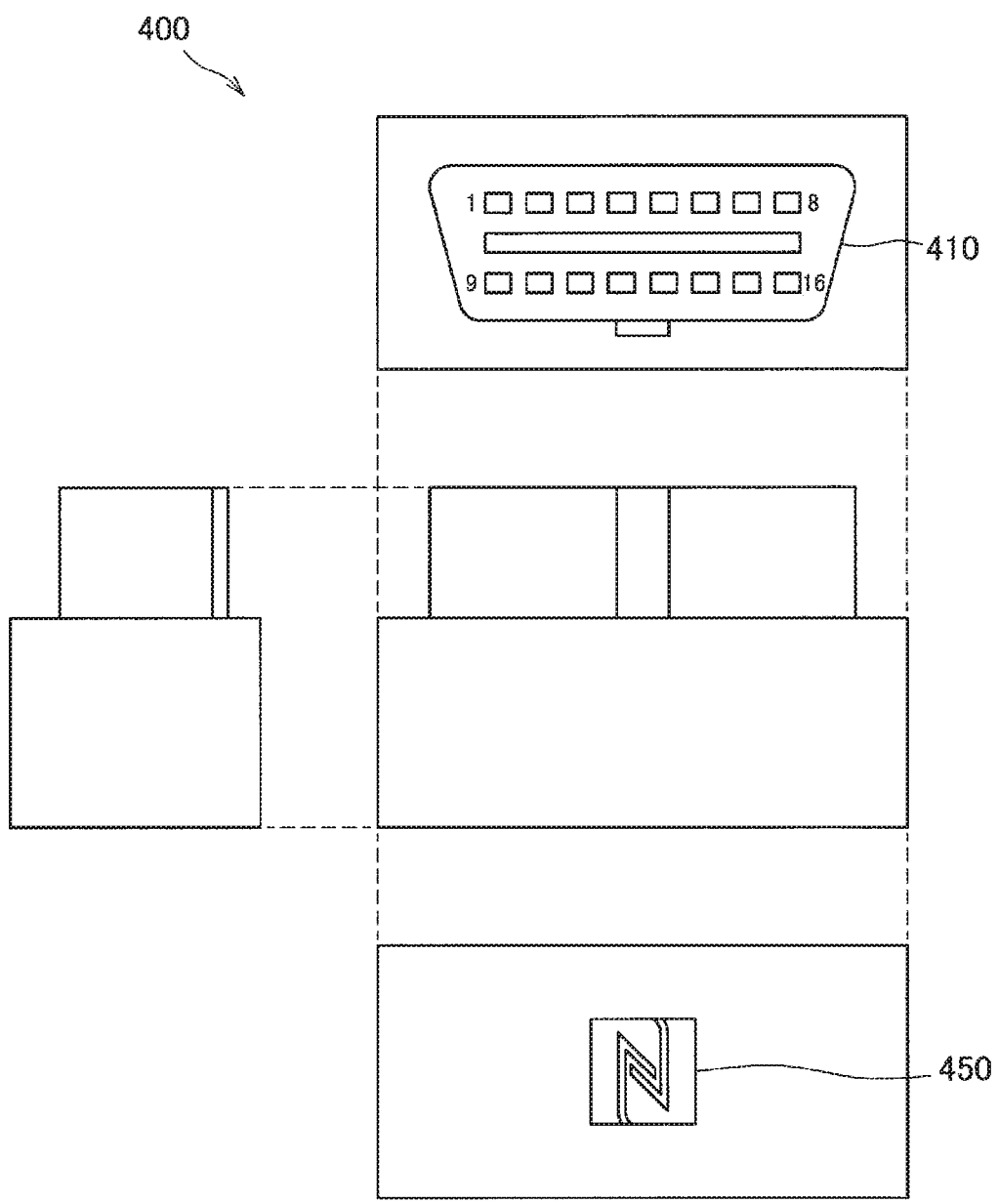
FIG. 14 is an explanatory diagram illustrating an example of appearance of the drive counter 400 according to the embodiment.

FIG. 14 is an explanatory diagram illustrating an example of appearance of a drive counter 400 according to the second embodiment of the present disclosure. The drive counter 400 illustrated in FIG. 14 includes an NFC reception antenna 450. By using the NFC reception antenna 450, it is possible for the drive counter 400 to perform near field communication and supply an electric power through wireless power feeding. Therefore, it is possible to confirm information on the drive counter by using a PC, a smartphone, or the like not only when the drive counter 400 illustrated in FIG. 14 is attached to the vehicle, but also when the drive counter 400 is detached from the vehicle.

Figure 15:
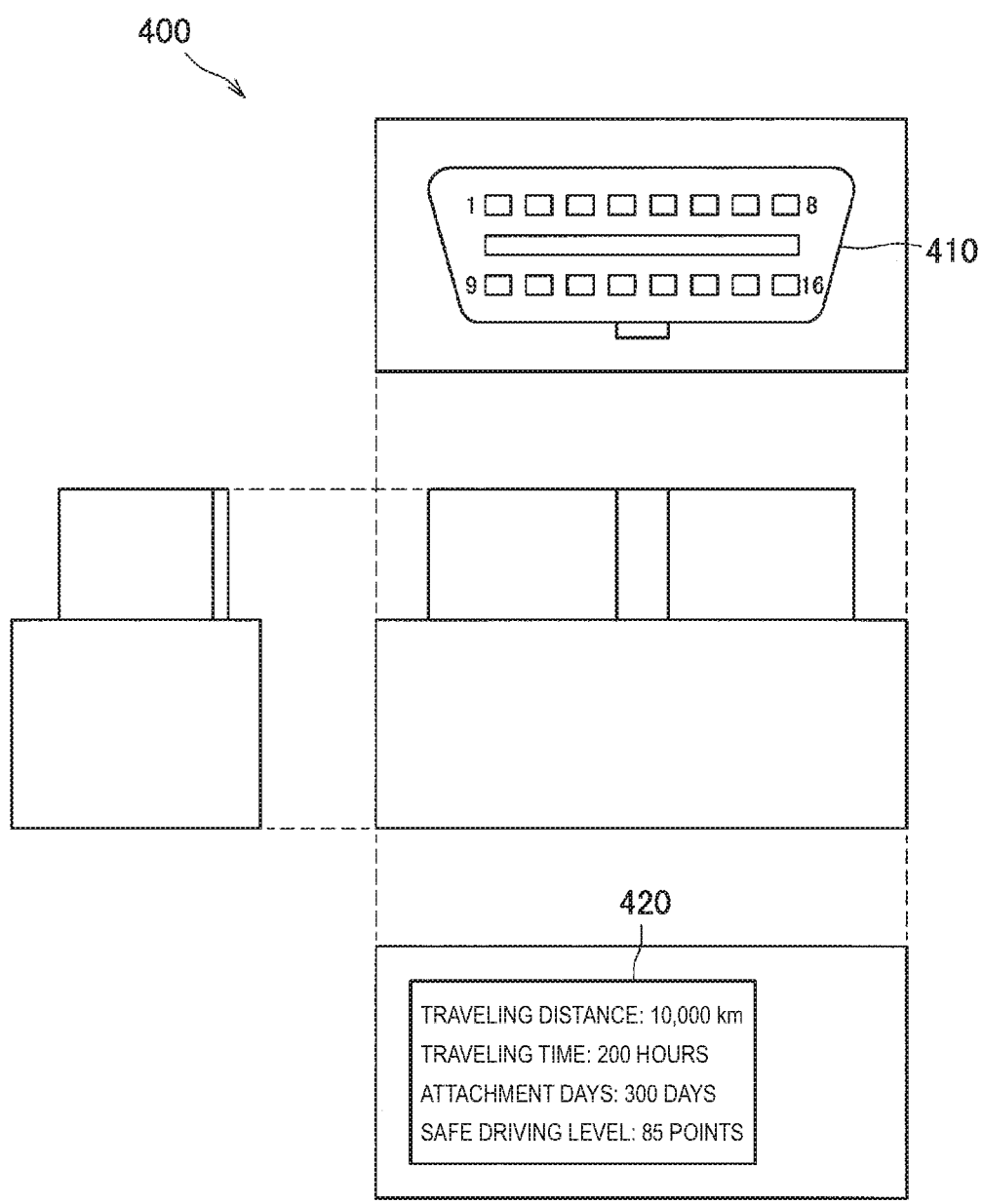
FIG. 15 is an explanatory diagram illustrating an example of appearance of the drive counter 400 according to the embodiment.

FIG. 15 is an explanatory diagram illustrating an example of appearance of a drive counter 400 according to the second embodiment of the present disclosure. The drive counter 400 illustrated in FIG. 15 includes the display unit 420 implemented by an electronic paper, a liquid crystal display, an organic EL display, or the like. Therefore, since the drive counter 400 illustrated in FIG. 15 includes the display unit 420, it is possible to confirm information on the drive counter not only when the drive counter 400 is attached to the vehicle, but also when the drive counter 400 is detached from the vehicle.

Figure 16:
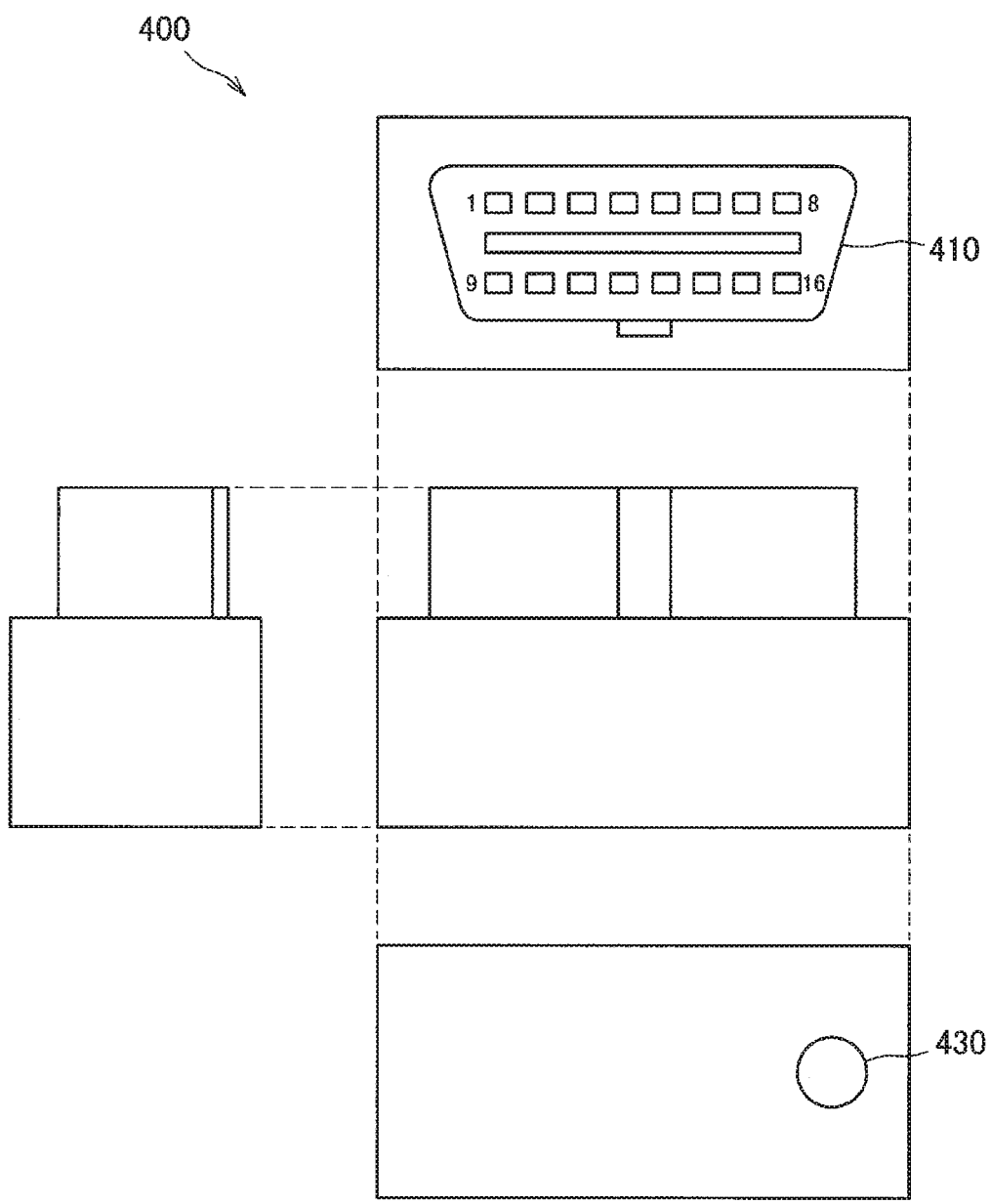
FIG. 16 is an explanatory diagram illustrating an example of appearance of the drive counter 400 according to the embodiment.

FIG. 16 is an explanatory diagram illustrating an example of appearance of a drive counter 400 according to the second embodiment of the present disclosure. The drive counter 400 illustrated in FIG. 16 includes the operation button 430. Since the drive counter 400 illustrated in FIG. 15 includes the operation button 430, it is possible to receive operation performed on the drive counter 400 not only when the drive counter 400 is attached to the vehicle, but also when the drive counter 400 is detached from the vehicle.

Figure 17:
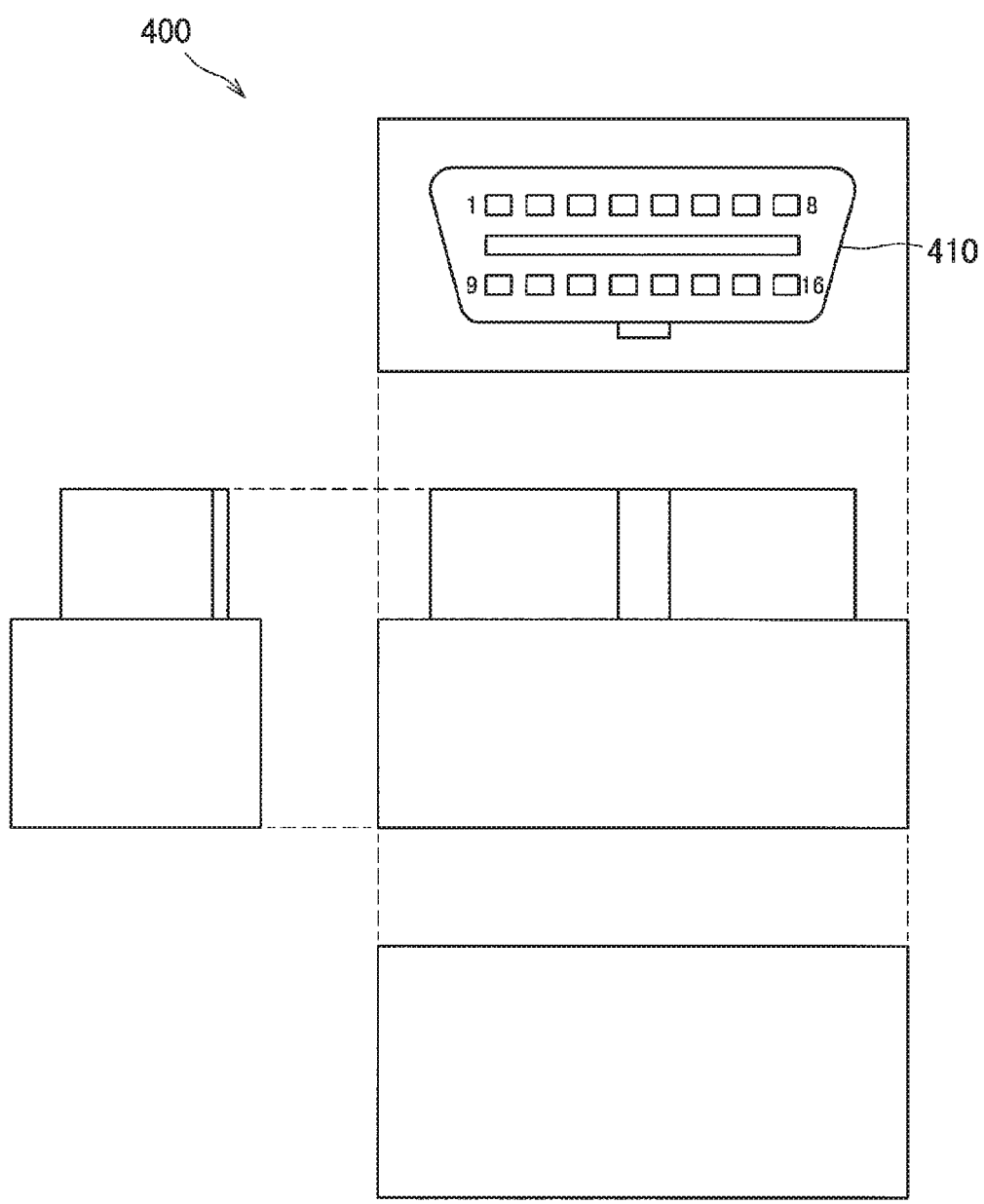
FIG. 17 is an explanatory diagram illustrating an example of appearance of the drive counter 400 according to the embodiment.

FIG. 17 is an explanatory diagram illustrating an example of appearance of a drive counter 400 according to the second embodiment of the present disclosure. The drive counter 400 illustrated in FIG. 17 includes the battery (not illustrated). Since the battery is embedded in the drive counter 400 illustrated in FIG. 17, the drive counter 400 can be used alone even when the drive counter 400 is detached from the vehicle. Since the drive counter 400 includes the battery and can operate alone, it is unnecessary to adjust time of the clock function after the device is attached to the vehicle, enhancing the convenience of the clock function. Specifically, it is also possible to use a function of measuring driving time, a function of measuring detachment time for which the drive counter 400 itself is detached from the vehicle, and the like. Furthermore, it is possible to use the communication function and the display function even when the drive counter 400 is detached from the vehicle.

As described above, it is possible for the drive counter 400 to easily acquire vehicle information from the vehicle and visualize a traveling situation of a vehicle. The use of the visualized data makes it possible to provide a driver with a solution according to the situation through the drive counter 400. By using the drive counter 400, not only conventional support through telephones, but also support closer to drivers can be provided, and it is possible to ease the driver's anxiety at the time of trouble and relieve the driver.

Specifically, when a traffic accident occurs and impact on a vehicle is detected, the drive counter 400 can automatically start an application in the mobile terminal carried by the user such as a smartphone to support the user involved in the trouble. When big impact is detected, the drive counter 400 can automatically send a notification to an emergency contact or the like through the mobile terminal carried by the user such as a smartphone. Furthermore, an advance notice of the vehicle state is sent to a roadside assistance provider, thereby making it possible to make an appropriate arrangement promptly by using the drive counter 400. In addition, the use of the traveling state recorded in the drive counter 400 immediately before and after an accident can expedite insurance payout and settlement negotiations or the like after the accident.

In addition, for example, in the case where an engine of a vehicle has trouble and does not start, the condition of a car is remotely diagnosed through the drive counter 400, thereby identifying the cause of the trouble. For example, when a decrease in battery voltage due to a low temperature is identified as the cause of the trouble on the basis of data transmitted from the drive counter 400 to a center, it is possible for the center to notify the user of a solution of increasing the temperature of the battery. Therefore, the user can solve the trouble soon on the spot without asking roadside assistance. By using the remote diagnostics, the center can decrease the frequency of roadside assistance and reduce the cost.

Figure 18:
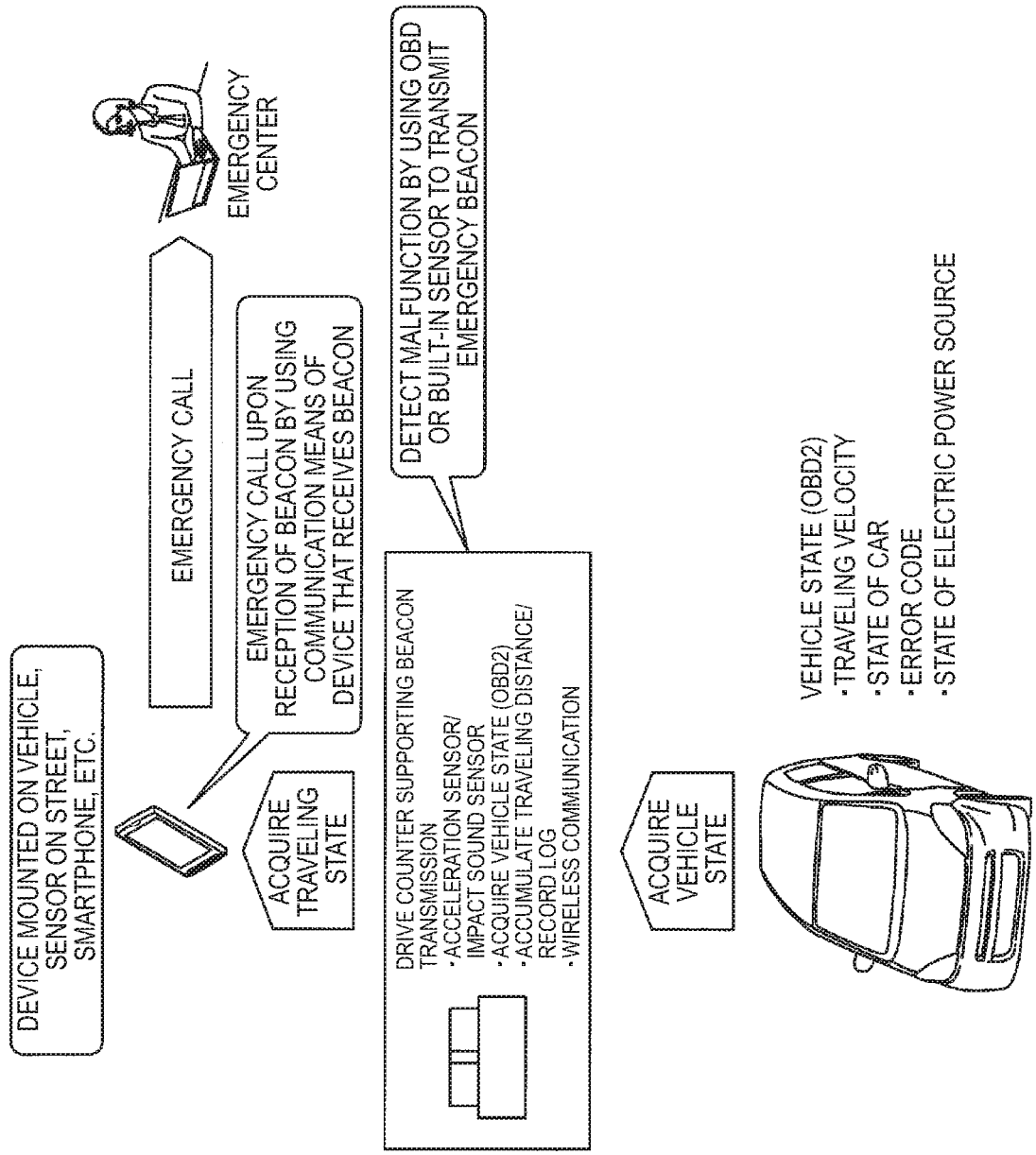
FIG. 18 is an explanatory diagram illustrating an effect of the drive counter 400 connected with a vehicle.

FIG. 18 to FIG. 21 are each an explanatory diagram illustrating an effect of the drive counter 400 connected with a vehicle. FIG. 18 illustrates a case where the drive counter 400 outputs a predetermined beacon, and an in-vehicle device, a sensor on a road, a smartphone, or the like that has received the beacon outputs a report to an emergency center.

Figure 19:
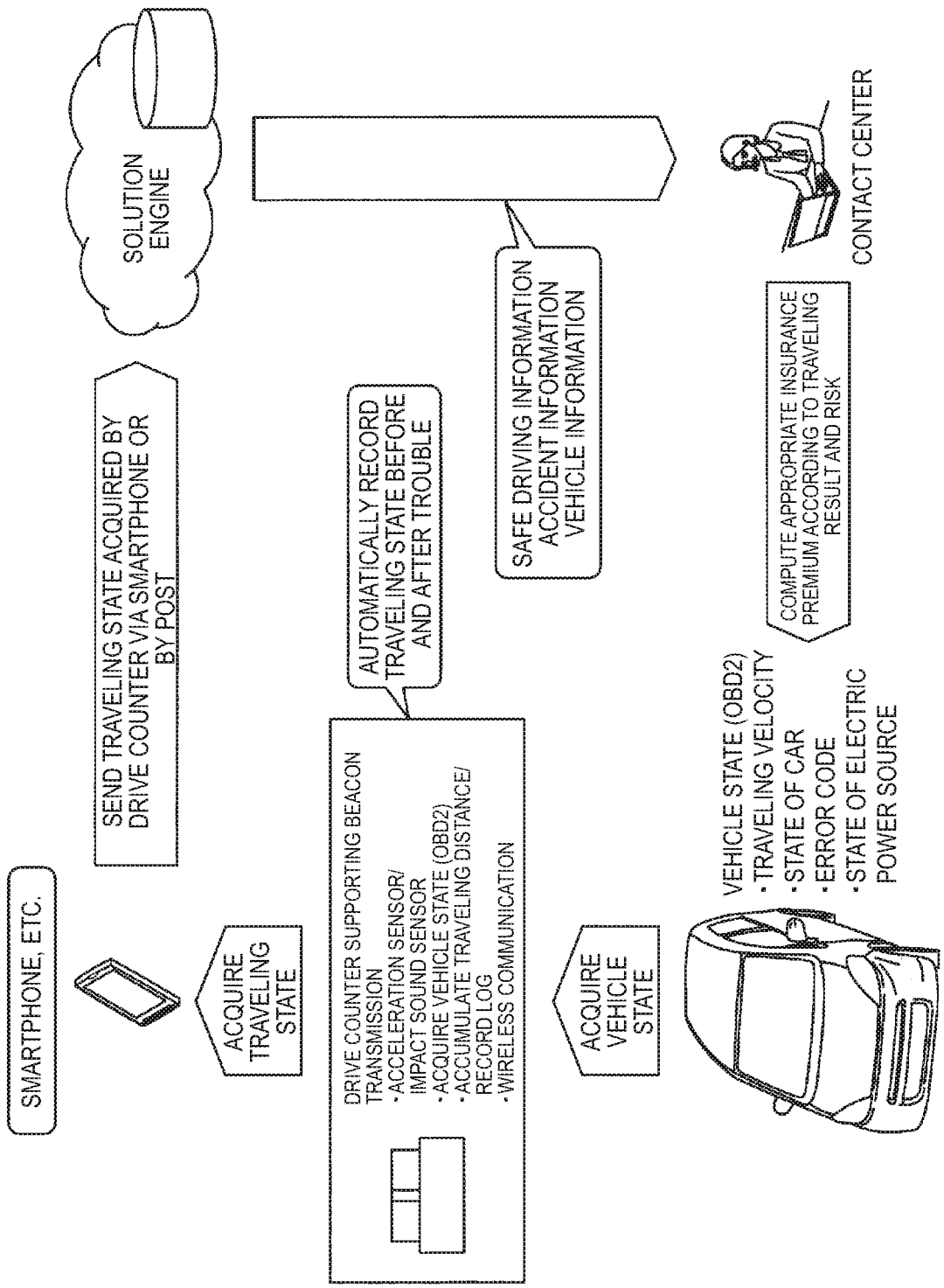
FIG. 19 is an explanatory diagram illustrating an effect of the drive counter 400 connected with a vehicle.

FIG. 19 illustrates a case where a smartphone that has acquired a traveling state from the drive counter 400 transmits the traveling state to the insurance company, and the insurance company computes an appropriate insurance premium in accordance with the traveling state.

Figure 20:
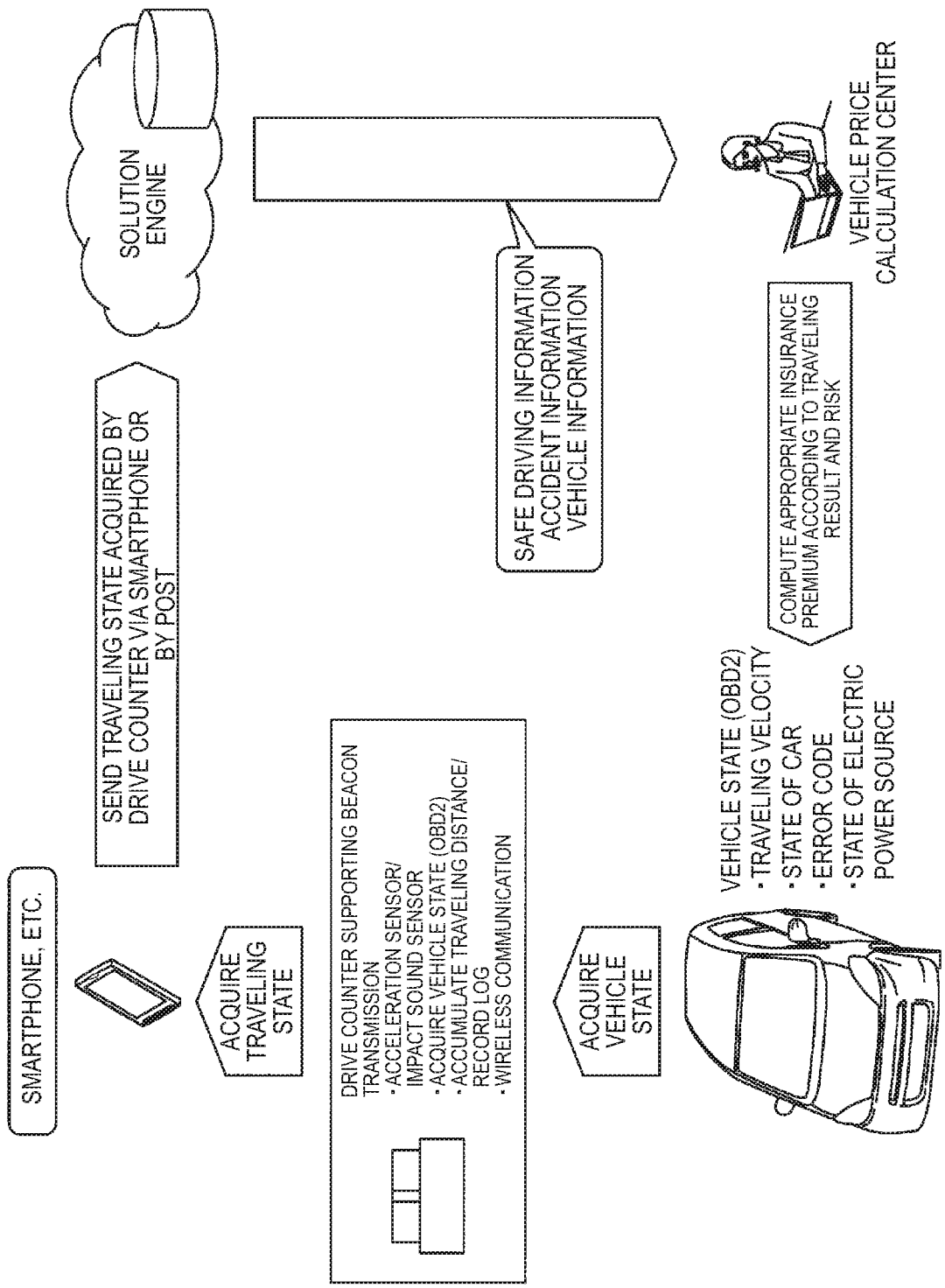
FIG. 20 is an explanatory diagram illustrating an effect of the drive counter 400 connected with a vehicle.

FIG. 20 illustrates a case where a smartphone that has acquired a traveling state from the drive counter 400 transmits the traveling state to the insurance company, and a car dealer computes an appropriate vehicle price in accordance with the traveling state.

FIG. 21 illustrates a case where a smartphone that has acquired a traveling state from the drive counter 400 transmits the traveling state to the insurance company, and a car dealer provides appropriate advice or support in accordance with the traveling state.

The basic functions of the drive counter 400 according to the second embodiment of the present disclosure are as follows. Since the drive counter 400 records acquired information on the vehicle in the non-volatile memory therein, the drive counter 400 does not always have to connect with an external server or the like, and the drive counter 400 can transmit the information to the outside later by using the communication function at any timing.

In addition, it is possible for the drive counter 400 to identify with voltage or the like that the drive counter 400 is attached to and detached from the vehicle, and to measure and record the attachment time by using a built-in clock function.

In addition, it is possible for the drive counter 400 to identify a connected vehicle on the basis of the acquired information on the vehicle, and to record the information for each vehicle.

In addition, it is possible for the drive counter 400 to measure and record average velocity and maximum velocity by using acquired velocity information on the vehicle and the built-in clock function.

In addition, it is possible for the drive counter 400 to measure and record a traveling distance by using acquired velocity information on the vehicle and the built-in clock function.

In addition, it is possible for the drive counter 400 to measure and record traveling time and a frequency of travel by using acquired velocity information on the vehicle and the built-in clock function.

In addition, it is possible for the drive counter 400 to measure and record acceleration and deceleration of the vehicle and the frequencies thereof by using acquired velocity information on the vehicle and the built-in clock function.

In addition, it is possible for the drive counter 400 to record a safe driving level. The safe driving level is computed from the attachment time of the device, a vehicle traveling distance, vehicle traveling time, vehicle average velocity, the acceleration and deceleration of the vehicle, the frequencies thereof, or the like.

In addition, it is possible for the drive counter 400 to constantly store vehicle information and the computed information in a primary memory. When the vehicle information exceeds a threshold set in advance or an error message occurs, the drive counter 40 can record detailed information on a situation before and after the occurrence the event in the non-volatile memory.

In addition, it is possible for the drive counter 400 to perform a falsification preventing process, for example, by converting the vehicle information and the computed information into hash values in order to prevent falsification of data, and then record the hash values in the non-volatile memory, or output the hash values by using the communication function.

In addition, when the drive counter 400 detects malfunction of the vehicle on the basis of the information acquired from the vehicle, it is possible for the drive counter 400 to establish communication by using the communication function to report a malfunction state.

In addition, it is possible for the drive counter 400 to read out information in the non-volatile memory by using electric power from an external communication device even when the drive counter 400 is detached from the vehicle.

In addition, it is possible for the drive counter 400 to read out information by displaying the output information on a non-volatile display device such as electronic paper even when the drive counter 400 is detached from the vehicle.

In addition, it is possible for the drive counter 400 to read out information by using the communication function even when the drive counter 400 is detached from the vehicle since the drive counter 400 includes the battery.

In addition, by using voltage or the like, it is possible for the drive counter 400 including the battery to recognize that the drive counter 400 is attached to and detached from the vehicle, and measure and record time for which the drive counter 400 is attached to the vehicle and time for which the drive counter 400 is detached from the vehicle by using the built-in clock function.

In addition, it is possible for the drive counter 400 including the battery to record a vehicle traveling time by using acquired velocity information on the vehicle and the built-in clock function.

In addition, it is possible for the drive counter 400 including the battery to set or adjust time of the built-in clock through communication with an external communication device.

In addition, since the drive counter 400 records a value acquired from the built-in sensor in the non-volatile memory, the drive counter 400 does not always have to connect with an external server or the like, and the drive counter 400 can transmit the information to the outside later by using the communication function at any timing.

Examples of the built-in sensor include the acceleration sensor, the gyro sensor, the geomagnetic sensor, the voltage sensor, the temperature sensor, the barometric pressure sensor, the humidity sensor, the GPS, the GNSS, or the like.

In addition, in the case where a value acquired from the built-in sensor exceeds a threshold set in advance, it is possible for the drive counter 400 to record detailed built-in sensor information and vehicle information on the situation before and after the change in the value in the non-volatile memory.

In addition, it is possible for the drive counter 400 to recognize that the drive counter 400 is attached to and detached from the vehicle from change in a value of the built-in sensor, and measure and record the attachment time by using a built-in clock function.

In addition, in the case where the value acquired from the built-in sensor exceeds a threshold set in advance, it is possible for the drive counter 400 to establish communication to report the malfunction state by using the communication function.

In addition, in the case of an emergency state in which malfunction is detected and a value exceeds a threshold set in advance, it is possible for the drive counter 400 to output a beacon to report the malfunction state by using the communication function. Since the drive counter 400 outputs the beacon, sensors in in-vehicle device nearby or sensors on a road, smartphones carried by people nearby can receive the beacon. Subsequently, it is possible to make a communication to the center or the like by using a communication function of a device that has received the beacon.

In addition, the device that has received the emergency state beacon from the drive counter 400 can add positional information obtained by a GPS, GNSS, or the like to a notification and issue the notification to the center or the like. In addition, the device that has received the emergency state beacon from the drive counter 400 can add positional information obtained by a GPS, GNSS, or the like to the beacon and retransmit the beacon, thereby locally issuing the notification of the emergency state.

In addition, the drive counter 400 can compute a risk for an accident by using the computed attachment time, the traveling distance, the traveling time, the average velocity, the safe driving level, the crash information, the error information, or the like. The insurance company can compute an insurance premium coefficient, the rate of a discounted/extra insurance premium, or a refund rate of an insurance premium in accordance with the risk of the accident computed by the drive counter 400. In addition, it is also possible for the insurance company to confirm whether the output information computed by the drive counter 400 is not falsified.

In addition, the drive counter 400 can accurately compute a state of the vehicle by using the computed attachment time, traveling distance, traveling time, average velocity, safe driving level, crash information, error information, or the like. The insurance company can compute a vehicle price coefficient, the rate of a discounted/extra vehicle price, or a refund rate in accordance with the state of the vehicle computed by the drive counter 400. In addition, it is possible for the insurance company to confirm whether the output information computed by the drive counter 400 is not falsified.

In addition, when trouble occurs, the drive counter 400 can made a necessary arrangement automatically or step by step by using the computed attachment time, traveling distance, traveling time, average velocity, safe driving level, crash information, error information, or the like. The arrangement necessary at the time of trouble means an emergency call, call support, a rescue support for an injured person, remote diagnostics, a roadside assistance arrangement, gas station guidance, convenience store guidance, a repair shop arrangement, a loaner car arrangement, a taxi (hired car) arrangement, a rental car arrangement, a traffic arrangement, a hotel (accommodations) arrangement, and the like.

In addition, when information stored in the internal non-volatile memory is read and written by using the communication function, the drive counter 400 can authenticate a user by using an authentication function, thereby limiting an accessible range of the information to exert access control.

The functions of the drive counter 400 described above are a mere example, and the functions of the drive counters 400 illustrated in FIGS. 12 to 16 are not limited thereto.

3. CONCLUSION

As described above, according to the embodiments of the present disclosure, it is possible to acquire information on behavior of a vehicle (moving body) with high accuracy.

According to the first embodiment of the present disclosure, there is provided the mobile terminal 200 configured to start sensing in response to a recording instruction from the moving body, record data on behavior of the moving body through the sensing, and transmit the recorded data to an external device.

In addition, according to the second embodiment of the present disclosure, there is provided the drive counter 400 configured to record the data on the behavior of the moving body through the sensing while the drive counter 400 is connected with the moving body, and configured to transmit the recorded data to an external device.

It may not be necessary to chronologically execute respective steps in the processing, which is executed by each device described in this specification, in the order described in the sequence diagrams or the flow charts. For example, the respective steps in the processing which is executed by each device may be processed in the order different from the order described in the flow charts, and may also be processed in parallel.

In addition, it is also possible to create a computer program for causing a hardware such as a CPU, ROM, and RAM, which are embedded in each device, to execute functions equivalent to the configurations of each device described above. Moreover, it may be possible to provide a storage medium having the computer program stored therein. In addition, respective functional blocks illustrated in the functional block diagrams may be implemented by hardware devices or hardware circuits, such that a series of processes may be implemented by the hardware devices or the hardware circuits.

Further, some or all functional blocks illustrated in the functional block diagrams used in the above description may be implemented by a server device connected via a network such as the Internet. Further, each of the functional blocks illustrated in the functional block diagrams used in the above description may be implemented by a single device or may be implemented by a system in which a plurality of devices collaborate with each other. Examples of the system in which a plurality of devices collaborate with each other include a combination of a plurality of server devices, a combination of a server device and a terminal device, and the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A recording device including:

a sensing unit configured to output data obtained through sensing;

a recording unit configured to start recording of the data that is output from the sensing unit and that relates to behavior of the moving body in accordance with a recording instruction from the moving body, and configured to ends recording of the data that is output from the sensing unit and that relates to behavior of the moving body in accordance with disruption of the recording instruction from the moving body; and a transmission unit configured to transmit the data recorded by the recoding unit to an external device.

(2)

The recording device according to (1), in which the recording unit starts recording of the data when a condition that identification information that is allocated in advance is identical to identification information included in the recording instruction is satisfied.

(3)

The recording device according to (1) or (2), in which the recording unit starts recording of the data when the data obtained through sensing performed by the sensing unit satisfies a predetermined condition.

(4)

The recording device according to (3), in which the recording unit starts recording of the data when a condition that a still state is detected from the data obtained through sensing performed by the sensing unit is satisfied.

(5)

The recording device according to (3), in which the recording unit starts recording of the data when a condition that a predetermined change in barometric pressure is detected from the data obtained through sensing performed by the sensing unit is satisfied.

(6)

The recording device according to (3), in which the recording unit starts recording of the data when a condition that movement from a predetermined position is detected from the data obtained through sensing performed by the sensing unit is satisfied.

(7)

The recording device according to any of (1) to (6), further including a determination unit configured to determine whether the recording device is in a still state in the moving body by using the data obtained through sensing performed by the sensing unit.

(8)

The recording device according to (7), in which, in the case where it is determined that the recording device is not in the still state in the moving body, the determination unit determines a state in the moving body from difference between data obtained through sensing performed by the moving body and data obtained through sensing performed by the sensing unit.

(9)

The recording device according to (7), in which the determination unit determines a target person of operation on the basis of data obtained through sensing performed by the sensing unit.

(10)

The recording device according to any of (1) to (9), further including an event detection unit configured to detect whether a predetermined event has occurred, through sensing performed by the sensing unit.

(11)

The recording device according to (10), in which the event detection unit detects whether the moving body has hit an object, through sensing performed by the sensing unit.

(14)

The recording device according to (10) or (11), including a display control unit configured to display a screen corresponding to an event detected by the event detection unit.

(13)

The recording device according to any of (1) to (12), including a display control unit configured to display a screen through which information on a traveling distance of the moving body is input, at a predetermined timing.

(14)

The recording device according to any of (1) to (13), including a display control unit configured to display information on traveling of the moving body, on the basis of the data obtained through sensing performed by the sensing unit in a predetermined time period.

(15)

The recording device according to (14), in which the display control unit displays information on driving of the moving body that has been generated by the external device on the basis of data transmitted from the transmission unit to the external device and that has been transmitted from the external device.

(16)

The recording device according to any of (1) to (15), including a display control unit configured to display information on a facility around the moving body on the basis of sensing performed by the sensing unit.

(17)

The recording device according to (1), in which the sensing unit includes at least an acceleration sensor, and the recording device is placed in the moving body, and the sensing unit outputs data corresponding to behavior of the moving body.

(18)

The recording device according to (3),
in which the recording control unit stops recording of the data when a condition that operation performed by a user on the recording device is detected from the data obtained through sensing performed by the sensing unit is satisfied.

(19)

The recording device according to (1),
in which the recording control unit controls start and stop of recording of the data output from the sensing unit, on the basis of a state of the recording device determined on the basis of the wireless signal from the signal transmission device and the data obtained through sensing performed by the sensing unit.

(20)

A recording method including:
starting sensing in response to a recording instruction from a moving body;
recording data on behavior of the moving body occurred due to the start of the sensing;
transmitting the recorded data to an external device; and
ending the sensing in accordance with disruption of the recording instruction from the moving body.

(21)

A computer program causing a computer to execute:
starting sensing in response to a recording instruction from a moving body;
recording data on behavior of the moving body occurred due to the start of the sensing;
transmitting the recorded data to an external device; and
ending the sensing in accordance with disruption of the recording instruction from the moving body.

REFERENCE SIGNS LIST 10 vehicle
100 signal output device
200 mobile terminal
400 drive counter

What is claimed is:

1. A device, comprising:
    circuitry configured to:
        store identification information associated with a vehicle;
        receive a wireless signal from a signal transmission device, wherein the signal transmission device is in the vehicle;
        start acquisition of first data based on the stored identification information associated with the vehicle and the wireless signal from the signal transmission device;
        detect a change in a cardinal direction of the vehicle;
        control start and stop of a recording process of the first data based on the detection of the change in the cardinal direction of the vehicle;
        detect the device in the vehicle is in a still state, wherein the still state represents a state in which the device is not in operation by a user in the vehicle;
        stop the recording process of the first data based on the detection that the device is not in the still state; and
        transmit the first data to an external device.

2. The device according to claim 1, wherein the circuitry is further configured to detect a specific sound associated with the vehicle and a change in a direction of travel of the vehicle from a first direction to a second direction.

3. The device according to claim 1, wherein,
    the wireless signal from the signal transmission device includes identification information, and
    the circuitry is further configured to:
        determine whether the stored identification information associated with the vehicle and the identification information included in the wireless signal are identical; and
        start acquisition of the first data based on the determination that the stored identification information associated with the vehicle and the identification information included in the wireless signal are identical.

4. The device according to claim 2, wherein the circuitry is further configured to:
    control start of the recording process of the first data based on start of the detection of the specific sound associated with the vehicle, wherein the specific sound includes at least one of vehicle start sound, a sound of an engine revving, travel sound, wind noise, or a sound of opening or closing of a door of the vehicle; and
    stop the recording process of the first data based on the detection that the specific sound is stopped.

5. The device according to claim 1, wherein:
    the device is in the vehicle, and
    the circuitry is further configured to output the first data that corresponds to a behavior of the vehicle.

6. The device according to claim 1, wherein the circuitry is further configured to:
    detect a plurality of conditions; and
    control start and stop of the recording process of the first data based on the detected plurality of conditions.

7. The device according to claim 6, wherein
    a first condition of the plurality of conditions indicates the still state of the vehicle based on the first data, and
    the circuitry is further configured to start the recording process of the first data based on satisfaction of the first condition.

8. The device according to claim 6, wherein
    a second condition of the plurality of conditions indicates a user operation on the device, and
    the circuitry is further configured to stop the recording process of the first data based on satisfaction of the second condition.

9. The device according to claim 6, wherein
    a third condition of the plurality of conditions indicates a particular change in a barometric pressure within the vehicle based on one of opening or closing of a door of the vehicle, or an air conditioner of the vehicle, and
    the circuitry is further configured to start the recording process of the first data based on satisfaction of the third condition.

10. The device according to claim 6, wherein
    a fourth condition of the plurality of conditions indicates a movement of the vehicle from a particular position based on the first data, and
    the circuitry is further configured to start the recording process of the first data based on satisfaction of the fourth condition.

11. The device according to claim 1, wherein
    the circuitry is further configured to determine a first state of the device in the vehicle, based on the first data, and
    the first state indicates that the device is in the still state in the vehicle.

12. The device according to claim 11, wherein
    the circuitry is further configured to determine a second state of the device in the vehicle, based on a difference between second data and the first data, the second data is obtained based on a sensing operation of the device, and the second state indicates that the device is not in the still state.

13. The device according to claim 1, wherein the circuitry is further configured to:

determine one of a first state of the device or a second state of the device based on the received wireless signal; and one of start or stop the recording process of the first data based on the first data and the one of the first state of the device or the second state of the device.

14. The device according to claim 1, further comprising a display screen, wherein the circuitry is further configured to:

detect an event associated with the vehicle based on the first data;

generate a user interface of a plurality of user interfaces based on a type of the detected event, wherein each user interface of the plurality of user interfaces comprises different information; and control the display screen to display the generated user interface corresponding to the event.

15. The device according to claim 14, wherein the circuitry is further configured to detect the event based on a collision of the vehicle, wherein the collision of the vehicle is detected based on one of reduction in a speed of the vehicle or occurrence of a shock in the vehicle, the event indicates that the vehicle has collided with an object, and the generated user interface corresponds to the event comprises a screen to contact a specific insurance provider.

16. The device according to claim 1, wherein the circuitry is further configured to display information that corresponds to a travel distance of the vehicle on a display screen, and the information on the travel distance of the vehicle is associated with an input at a particular timing.

17. The device according to claim 1, wherein the circuitry is further configured to display information that corresponds to traveling of the vehicle, based on the first data, and the first data is associated with a particular time period.

18. The device according to claim 1, wherein the circuitry is further configured to control display of information that corresponds to a facility around the device and a coupon redeemable in the facility, based on the first data.

19. A recording method, comprising:

in a device:

storing identification information associated with a vehicle;

receiving a wireless signal from a signal transmission device, wherein the signal transmission device is in the vehicle;

starting acquisition of first data based on the stored identification information associated with the vehicle and the wireless signal from the signal transmission device;

detecting a change in a cardinal direction of the vehicle;

controlling start and stop of a recording process of the first data based on the detection of the change in the cardinal direction of the vehicle;

detecting the device in the vehicle is in a still state, wherein the still state represents a state in which the device is not in operation by a user in the vehicle;

stopping the recording process of the first data based on the detection that the device is not in the still state; and transmitting the first data to an external device.

20. A non-transitory computer-readable medium having stored thereon computer-executable instructions, which when executed by a device, cause the device to execute operations, the operations comprising:

storing identification information associated with a vehicle;

receiving a wireless signal from a signal transmission device, wherein the signal transmission device is in the vehicle;

starting acquisition of first data based on the stored identification information associated with the vehicle and the wireless signal from the signal transmission device;

detecting a change in a cardinal direction of the vehicle;

controlling start and stop of a recording process of the first data based on the detection of the change in the cardinal direction of the vehicle;

detecting the device in the vehicle is in a still state, wherein the still state represents a state in which the device is not in operation by a user in the vehicle;

stopping the recording process of the first data based on the detection that the device is not in the still state; and transmitting the first data to an external device.

21. A device, comprising:

circuitry configured to:

store identification information associated with a vehicle;

receive a wireless signal from a signal transmission device, wherein the signal transmission device is in the vehicle;

start acquisition of first data based on the stored identification information associated with the vehicle and the wireless signal from the signal transmission device;

detect a specific sound associated with the vehicle and a change in a direction of travel of the vehicle from a first direction to a second direction;

control start and stop of a recording process of the first data based on at least one of the detection of the specific sound associated with the vehicle or the change in the direction of travel of the vehicle;

detect the device in the vehicle is in a still state, wherein the still state represents a state in which the device is not in operation by a user in the vehicle;

stop the recording process of the first data based on the detection that the device is not in the still state; and transmit the first data to an external device.

* * * * *